US007618319B2

(12) United States Patent
Casey et al.

(10) Patent No.: US 7,618,319 B2
(45) Date of Patent: Nov. 17, 2009

(54) GAMING MACHINE WITH INTERACTIVE POP-UP WINDOWS PROVIDING ENHANCED GAME PLAY SCHEMES

(75) Inventors: Michael P. Casey, Chicago, IL (US); Allon G. Englman, Chicago, IL (US); Daniel P Fiden, Chicago, IL (US); Jeremy M. Hornik, Chicago, IL (US); Joel R. Jaffe, Evanston, IL (US)

(73) Assignee: WMS Gaming, Inc., Waukegan, IL (US)

(*) Notice: Subject to any disclaimer, the term of this patent is extended or adjusted under 35 U.S.C. 154(b) by 818 days.

(21) Appl. No.: 10/832,564

(22) Filed: Apr. 27, 2004

(65) Prior Publication Data

US 2004/0219969 A1 Nov. 4, 2004

Related U.S. Application Data

(63) Continuation-in-part of application No. 10/428,516, filed on May 1, 2003.

(51) Int. Cl.
*A63F 9/24* (2006.01)
*A63F 13/00* (2006.01)
*G06F 17/00* (2006.01)
*G06F 19/00* (2006.01)
*A63F 3/08* (2006.01)

(52) U.S. Cl. .............................. 463/25; 463/20; 463/27; 463/30; 463/31; 463/34; 273/274

(58) Field of Classification Search ................... 463/20, 463/25, 27, 30, 31, 34; 273/274
See application file for complete search history.

(56) References Cited

U.S. PATENT DOCUMENTS 5,632,485 A 5/1997 Woodlamd et al. .......... 273/292
5,720,662 A 2/1998 Holmes, Jr. et al. ........... 463/20

(Continued)

FOREIGN PATENT DOCUMENTS

WO WO 97/019736 A1 6/1997

(Continued)

OTHER PUBLICATIONS

WMS Gaming Inc., "Big Bang Piggy Bankin'™", *Product Sheet,* (undated), 1 page.

(Continued)

*Primary Examiner*—John M Hotaling, II
*Assistant Examiner*—Adetokunbo Torimiro
(74) *Attorney, Agent, or Firm*—Nixon Peabody LLP

(57) ABSTRACT

A gaming machine with interactive pop-up windows providing enhanced game play schemes, including side-bet schemes, is described herein. Placing a side-bet utilizing interactive pop-up windows enables the player to make an additional wager to "purchase" one of any number of game enhancements, or to "side-bet" that the game outcome will include a particular symbol or symbol combination, depending on the side-bet scheme enabled for a particular gaming machine. In an embodiment, the player has an option to select one or more side-bet(s) via a pop-up window(s) prior to game play initiation. In another embodiment, the player has an option to select one or more side-bet(s) via a pop-up window(s) after a partial game outcome is displayed.

32 Claims, 26 Drawing Sheets

U.S. PATENT DOCUMENTS

| | | | | |
|---|---|---|---|---|
| 5,851,148 | A | 12/1998 | Brune et al. | 463/25 |
| 6,056,642 | A | 5/2000 | Bennett | 463/20 |
| 6,068,552 | A | 5/2000 | Walker et al. | 463/21 |
| 6,089,977 | A | 7/2000 | Bennett | 463/20 |
| 6,110,041 | A | 8/2000 | Walker et al. | 463/20 |
| 6,120,378 | A | 9/2000 | Moody et al. | 463/20 |
| 6,155,925 | A | 12/2000 | Giobbi et al. | 463/20 |
| 6,159,095 | A * | 12/2000 | Frohm et al. | 463/19 |
| 6,179,711 | B1 | 1/2001 | Yoseloff | 463/25 |
| 6,203,429 | B1 | 3/2001 | Demar et al. | 463/20 |
| 6,210,277 | B1 * | 4/2001 | Stefan | 463/27 |
| 6,227,969 | B1 | 5/2001 | Yoseloff | 463/13 |
| 6,237,916 | B1 | 5/2001 | Webb | 273/292 |
| 6,251,013 | B1 | 6/2001 | Bennett | 463/13 |
| 6,254,481 | B1 | 7/2001 | Jaffe | 463/20 |
| 6,261,178 | B1 | 7/2001 | Bennett | 463/20 |
| 6,270,411 | B1 | 8/2001 | Gura et al. | 463/20 |
| 6,290,600 | B1 | 9/2001 | Glasson | 463/20 |
| 6,350,199 | B1 | 2/2002 | Williams et al. | 463/16 |
| 6,419,579 | B1 | 7/2002 | Bennett | 463/20 |
| 6,520,856 | B1 | 2/2003 | Walker et al. | 463/21 |
| 6,561,904 | B2 | 5/2003 | Locke et al. | 463/25 |
| 6,746,328 | B2 | 6/2004 | Cannon et al. | 463/17 |
| 6,793,578 | B2 | 9/2004 | Luccesi et al. | 463/20 |
| 6,869,362 | B2 * | 3/2005 | Walker et al. | 463/25 |
| 6,960,133 | B1 | 11/2005 | Marks et al. | 463/20 |
| 2002/0020965 | A1 * | 2/2002 | Potter et al. | 273/274 |
| 2002/0055382 | A1 | 5/2002 | Meyer | 463/20 |
| 2002/0086725 | A1 | 7/2002 | Fasbender et al. | 463/11 |
| 2002/0142825 | A1 | 10/2002 | Lark et al. | 463/16 |
| 2002/0142846 | A1 | 10/2002 | Paulsen | 463/43 |
| 2002/0147047 | A1 * | 10/2002 | Letovsky et al. | 463/42 |
| 2002/0155881 | A1 * | 10/2002 | Yoshida | 463/20 |
| 2002/0196342 | A1 | 12/2002 | Walker et al. | 348/157 |
| 2003/0027626 | A1 | 2/2003 | Marks et al. | 463/20 |
| 2003/0032476 | A1 * | 2/2003 | Walker et al. | 463/25 |
| 2003/0064797 | A1 * | 4/2003 | Jackson et al. | 463/25 |
| 2003/0064800 | A1 * | 4/2003 | Jackson et al. | 463/30 |
| 2003/0119579 | A1 * | 6/2003 | Walker et al. | 463/20 |
| 2003/0162585 | A1 * | 8/2003 | Bigelow et al. | 463/20 |
| 2003/0216169 | A1 | 11/2003 | Walker et al. | 463/25 |
| 2004/0005919 | A1 * | 1/2004 | Walker et al. | 463/23 |
| 2004/0053683 | A1 | 3/2004 | Hartl et al. | 463/25 |
| 2004/0092299 | A1 | 5/2004 | Gauselmann | 463/16 |
| 2004/0092300 | A1 | 5/2004 | Gauselmann | 463/16 |
| 2004/0100025 | A1 | 5/2004 | Conklin et al. | 273/292 |
| 2004/0192434 | A1 * | 9/2004 | Walker et al. | 463/25 |
| 2004/0204232 | A1 * | 10/2004 | Asher et al. | 463/25 |
| 2004/0242316 | A1 | 12/2004 | Oles et al. | 463/20 |
| 2004/0266507 | A1 | 12/2004 | Cooper | 463/13 |
| 2005/0054412 | A1 | 3/2005 | Gauselmann | 463/16 |
| 2006/0211484 | A1 | 9/2006 | Hornik et al. | 463/25 |

FOREIGN PATENT DOCUMENTS

| | | | |
|---|---|---|---|
| WO | WO 00/32286 | A1 | 6/2000 |
| WO | WO 01/15055 | A1 | 3/2001 |
| WO | WO 01/33478 | A1 | 5/2001 |
| WO | WO-01/33478 | A1 | 5/2001 |
| WO | WO 02/054331 | | 7/2002 |
| WO | WO 03/089084 | A1 | 10/2003 |
| WO | WO-03/089084 | A1 | 10/2003 |

OTHER PUBLICATIONS

WMS Gaming Inc., "Stroke of Luck™", *Product Sheet,* (undated), 1 page.

WMS Gaming Inc., "Top Cat™", *Product Sheet,* (undated), 1 page.

WMS Gaming Inc., "Winning Streak™", *Product Sheet,* (undated), 1 page.

* cited by examiner

GAMING MACHINE WITH INTERACTIVE POP-UP WINDOWS PROVIDING ENHANCED GAME PLAY SCHEMES

REFERENCE TO RELATED APPLICATIONS

This application is a Continuation In Part of U.S. patent application Ser. No. 10/428,516 filed May 1, 2003 and entitled "Gaming Machine With Interactive Pop-up Windows."

FIELD OF THE INVENTION

The present invention relates generally to gaming machines and, more particularly, to a gaming machine with interactive pop-up windows that provide a player with an opportunity to configure different aspects of a wagering game. For example, the pop-up windows may allow the player to make special wagers, modify the appearance or function of symbols, view a pay history for a particular symbol, and/or select enhanced game play schemes.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning on each machine is roughly the same (or believed to be the same), players are most likely to be attracted to the most entertaining and exciting of the machines. Shrewd operators consequently strive to employ the most entertaining and exciting machines available because such machines attract frequent and extended play and hence increase profitability to the operator. Accordingly, in the competitive gaming machine industry, there is a continuing need for gaming machine manufacturers to produce new types of games, or enhancements to existing games, which will attract frequent and extended play by enhancing the entertainment value and excitement associated with the game.

U.S. application Publication No. US 2003/0064800 A1 to Jackson et al. ("Jackson et al.") notes that games displayed by video gaming machines are becoming increasingly complex. In an effort to provide a video gaming machine that is more easily understood by a player and yet provides all the features and excitement as any modem gaming machine, Jackson et al. proposes a video gaming machine with pop-up windows. Touching various icons on a touch screen video display, such as the symbols on simulated reels, pay line identifiers, and other icons, causes an associated pop-up window or other overlay to be generated. The overlay highlights or explains the selected feature. Jackson et al. asserts that such overlays reduce clutter on the display, can be graphically intensive to avoid the use of text, can be easily understood, can be quickly and logically accessed, and may even include animation. Jackson et al., however, is generally limited to the passive use of overlays for obtaining information about a selected feature so that the selected feature can be understood by the player.

Another U.S. patent application Ser. No. 10/731,941 to Englman et al., entitled "Gaming Machine Having An Enhanced Game Play Scheme", discloses a gaming machine, where in response to receipt of a second wager to select an option for enhanced game play, a player is provided with enhanced game play. Enhanced game play includes enhancing an existing aspect of the wagering base game. The option is for enhanced game play is preferably offered only to a player who has placed a maximum bet for the game (e.g., the player has selected the maximum number of pay lines and the maximum allowable credits per pay line). The gaming machine can be configured with either a video main display or an electromechanical main display (e.g., electromechanical spinning reels) with superimposed video images thereon provided by a flat panel transmissive display positioned in front of the electromechanical main display.

SUMMARY OF THE INVENTION

A gaming machine with interactive pop-up windows providing enhanced game play schemes, including side-bet schemes, is described herein. Placing a side-bet utilizing interactive pop-up windows enables the player to make an additional wager to "purchase" one of any number of game enhancements, or to "side-bet" that the game outcome will include a particular symbol or symbol combination, depending on the side-bet scheme enabled for a particular gaming machine. In an embodiment, the player has an option to select one or more side-bet(s) via a pop-up window(s) prior to game play initiation. In another embodiment, the player has an option to select one or more side-bet(s) via a pop-up window (s) after a partial game outcome is displayed.

Additional aspects of the invention will be apparent to those of ordinary skill in the art in view of the detailed description of various embodiments, which is made with reference to the drawings, a brief description of which is provided below.

BRIEF DESCRIPTION OF THE DRAWINGS

The foregoing and other advantages of the invention will become apparent upon reading the following detailed description and upon reference to the drawings in which.

Figure 1:
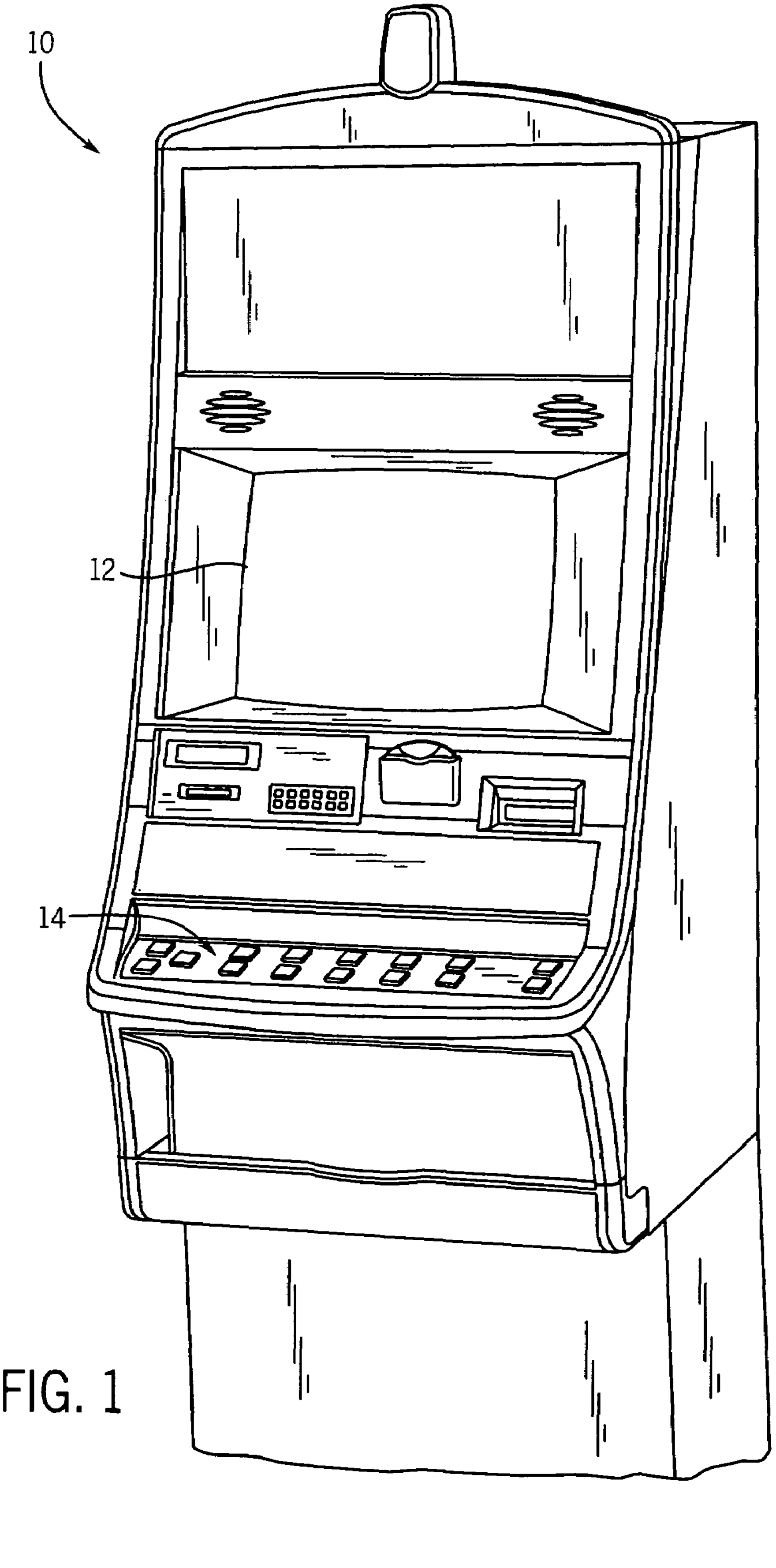
FIG. 1 is a perspective view of a video gaming machine embodying the present invention.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents, and alternatives falling within the spirit and scope of the invention as defined by the appended claims.

DESCRIPTION OF SPECIFIC EMBODIMENTS

The description of the specific embodiments is to be construed as exemplary only and does not describe every possible embodiment of the invention. Numerous alternative embodiments could be implemented, using either current technology or technology developed after the filing date of this patent, which would still fall within the scope of the claims defining the invention.

As described below, the present invention is preferably implemented using a video slot machine. It is contemplated that the present invention may also be implemented using other types of video gaming machines or, in some cases, using an adaptable mechanical spinning reel gaming machine having flat panel transmissive display positioned in front of the mechanical spinning reels. The flat panel transmissive display is adapted to, among other things, superimpose video images upon the mechanical spinning reels. A mechanical spinning reel gaming machine with superimposed video images generated by a flat panel transmissive display is described in U.S. Pat. No. 6,517,433, entitled "Reel Spinning Slot Machine With Superimposed Video Image", naming Loose et al. as inventors, filed May 22, 2001, and herein incorporated by reference in its entirety.

Turning now to the drawings and referring initially to FIG. 1, a video gaming machine 10 is operable to play a video wagering game. The gaming machine 10 includes a video display 12 preferably in the form of a cathode ray tube (CRT), liquid crystal display (LCD), plasma, or other type of video display known in the art. A touch screen panel of the resistive, capacitive, or surface wave type is attached externally to the display 12. In the illustrated embodiment, the gaming machine 10 is an "upright" version in which the display 12 is oriented vertically relative to the player. Alternatively, the gaming machine may be a "slant-top" version in which the display 12 is slanted at about a thirty-degree angle toward the player of the gaming machine 10.

Figure 2:
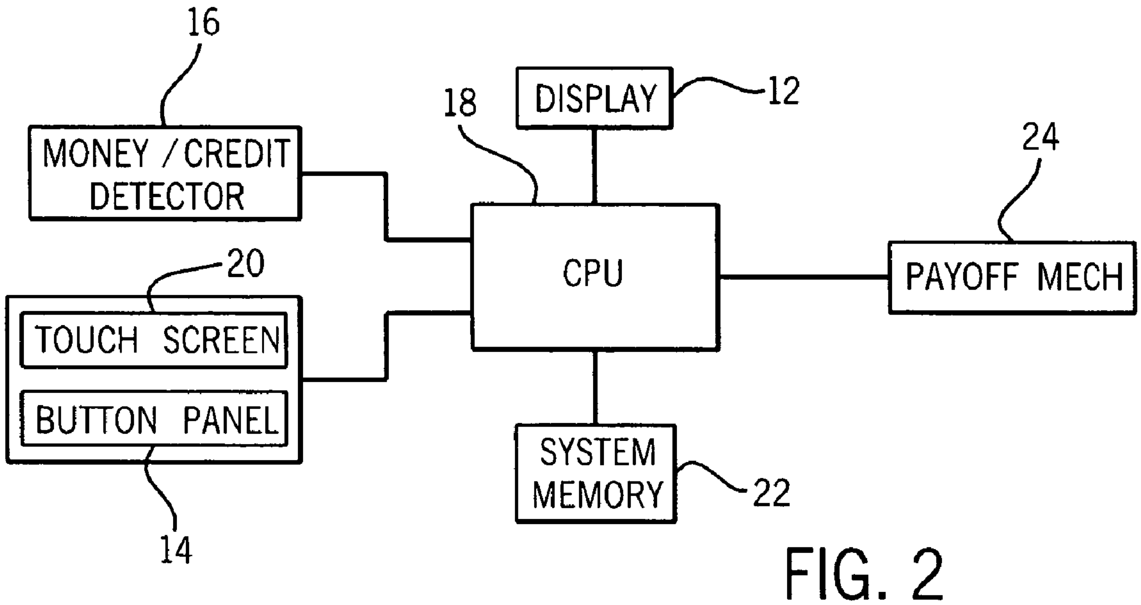
FIG. 2 is a block diagram of a control system suitable for operating the gaming machine.

FIG. 2 is a block diagram of a control system suitable for operating the gaming machine 10. Money/credit detector 16 signals a central processing unit ("CPU") 18 when a player has inserted money or played a number of credits. The money may be provided by coins, bills, tickets, coupons, cards, etc. Using a button panel 14 (see FIG. 1) and/or a touch screen 20, the player may select any variables associated with the wagering game, and place his/her wager to purchase a play of the game. During a play of the game, the CPU 18 generates at least one random event using a random number generator (RNG) and provides an award to the player for a winning outcome of the random event. The CPU 18 operates the display 12 to represent the random event(s) and outcome(s) in a visual form that can be understood by the player. In addition to the CPU 18, the control system may include one or more additional slave control units for operating the display 12.

A system memory 22 stores control software, operational instructions and data associated with the gaming machine 10. In one embodiment, the system memory 22 comprises a separate read-only memory (ROM) and battery-backed random-access memory (RAM). However, it will be appreciated that the system memory 22 may be implemented on any of several alternative types of memory structures or may be implemented on a single memory structure. A payoff mechanism 24 is operable in response to instructions from the CPU 18 to award a payoff to the player in response to certain winning outcomes that might occur in the basic game or bonus events. The payoff may be provided in the form of coins, bills, tickets, coupons, cards, etc. The payoff amounts are determined by one or more pay tables stored in the system memory 22.

The present invention is described below in the context of a video reel slot game. It should, however, be understood that the present invention may be implemented with other video wagering games such as poker, keno, bingo, blackjack, or roulette. The description below first describes the operation of a video reel slot game and then describes how a player can use interactive pop-up windows to configure different aspects of the game.

Figure 3:
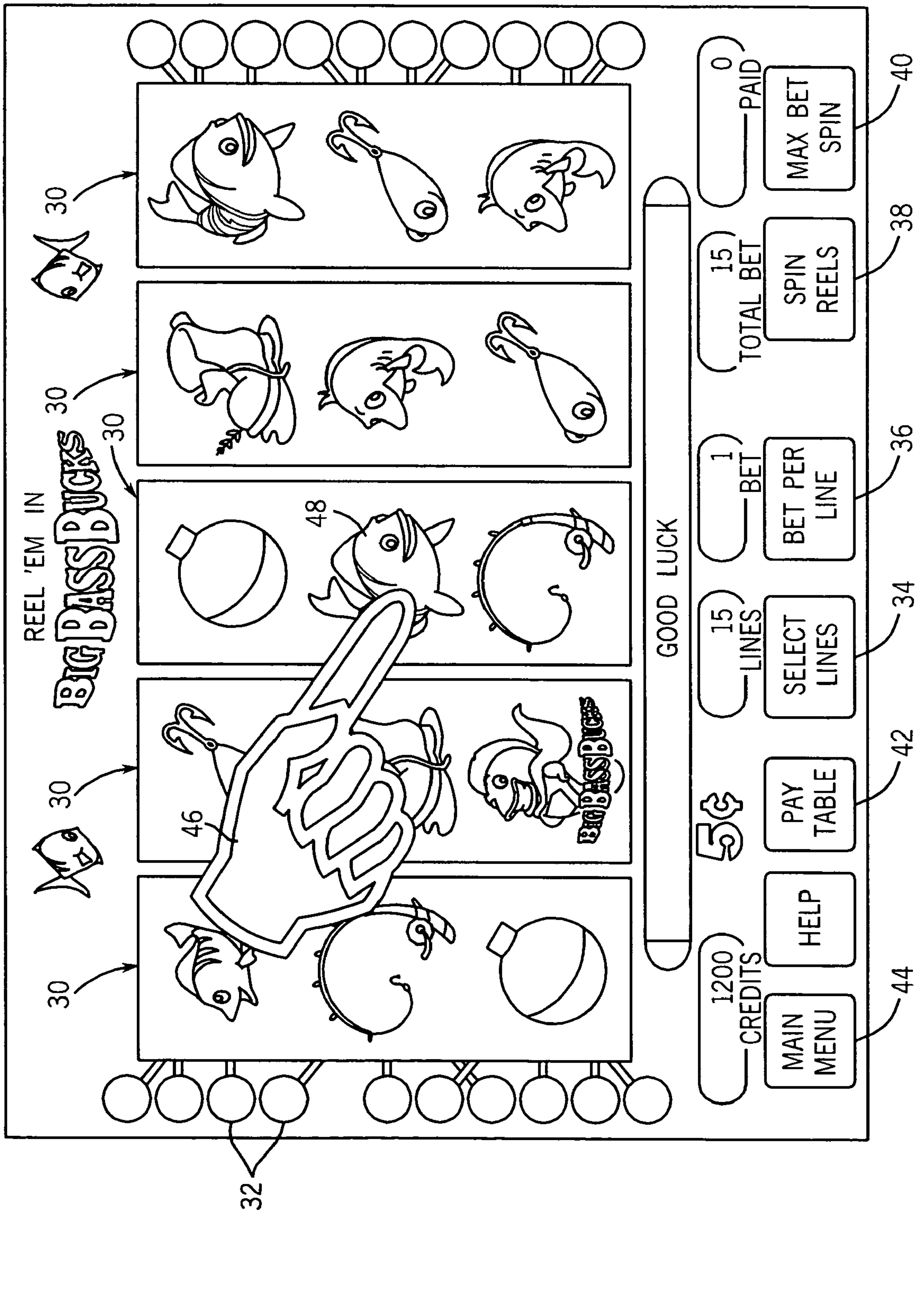
FIGS. 3 through 7 are display images showing the use of a pop-up window to make a side-bet.

The operation of the video reel slot game is described with reference to FIG. 3. Referring to FIG. 3, a basic, or base, video slot game is implemented on the display 12 on simulated reels 30 that are rotated and stopped to place symbols on the reels 30 in visual association with a number of pay lines 32. In the illustrated example, the number of reels 30 is five and the number of pay lines 32 is nine, fifteen, or twenty. The number of reels and pay lines may, however, be varied to include more or less than the number illustrated. Each of the pay lines 32 extends through one symbol on each of the reels 30.

Generally, game play is initiated by inserting money or playing a number of credits, causing the CPU to activate a number of pay lines corresponding to the amount of money or number of credits played. In one embodiment, the player selects the number of pay lines (between one and nine) to play by pressing a "Select Lines" key 34. The player then chooses the number of coins or credits to wager on the selected pay lines by pressing a "Bet Per Line" key 36. After selecting a number of pay lines and a wager amount, the reels 30 may be set in motion by touching a "Spin Reels" key 38 or, if the player wishes to bet the maximum amount per line, by using a "Max Bet Spin" key 40. Alternatively, other mechanisms such as a lever or push button may be used to set the reels in motion.

The CPU uses a random number generator (RNG) to select a game outcome (e.g., a "basic" game outcome) corresponding to a particular set of reel "stop positions." The CPU then causes each of the simulated reels 30 to stop at the appropriate stop position corresponding to the selected game outcome. Video symbols displayed on the reels 30 graphically illustrate the reel stop positions and indicate to the player whether the stop positions of the reels represent a winning game outcome.

A pay table identifies winning basic (or "base") game outcomes (e.g., symbol combinations resulting in an award of credits or a bonus event) and the awards associated with such outcomes. In one embodiment, the pay table is affixed to the machine 10 and/or displayed by the video display 12 in response to a command by the player (e.g., by pressing a "Pay Table" button 42). A winning basic game outcome occurs when the video symbols appearing on the reels 30 along an active pay line correspond to one of the winning symbol combinations displayed on the pay table. A winning symbol combination, for example, could be three or more matching symbols along an active pay line. Typically, the award is greater as the number of matching symbols along the active pay line increases. If the displayed video symbols of the stopped reels 30 align in a winning symbol combination, the game provides the award identified in the pay table for that winning symbol combination. If the award is a number of credits, the game typically multiplies that number of credits by the number of credits wagered on the winning pay line. The player may collect the amount of accumulated credits by pressing a "Collect" button 44. In the illustrated example, the winning symbol combinations start from the leftmost reel and span adjacent reels, i.e., winning line pay combinations pay left to right only. In an alternative implementation, the winning combinations start from either the leftmost reel or the rightmost reel and span adjacent reels, i.e., winning line pay combinations pay left to right and right to left.

Included among the plurality of basic game outcomes are start-feature outcomes for triggering play of different bonus events. The bonus events may, for example, include The Big Bass Bonus and The Fishin' Bonus referenced in FIG. 8 and may include any type of game, either similar to or completely different from the basic video reel slot game. A start-feature outcome may be defined in one of any number of suitable ways. For example, a start-feature outcome may occur when a special start-feature symbol or a special combination of symbols appears on one or more of the reels 30. The start-feature outcome may require the combination of symbols to appear along an active pay line, or may alternatively require that the combination of symbols appear anywhere on the display (i.e., "scattered") regardless of whether the symbols are along an active pay line. The appearance of a start-feature outcome causes the CPU to shift operation from the basic game to the associated bonus event. Upon completion of the bonus event, the CPU shifts operation back to the basic game.

In accordance with the present invention, the player can open interactive pop-up windows by touching different portions of the touch screen video display 12 and can, in turn, configure different aspects of the wagering game via the pop-up windows. Several figures (i.e., FIGS. 3, 4, 5, 8, 9, 10, 11, 13, 14, 15, 17, 18, 24, and 25) depict a hand 46 pointing to a portion of the display image. The hand 46 is not part of the display image, but rather represents the player's physical hand touching a portion of the display image to either open a pop-up window or select an option within a previously opened pop-up window.

Figure 4:
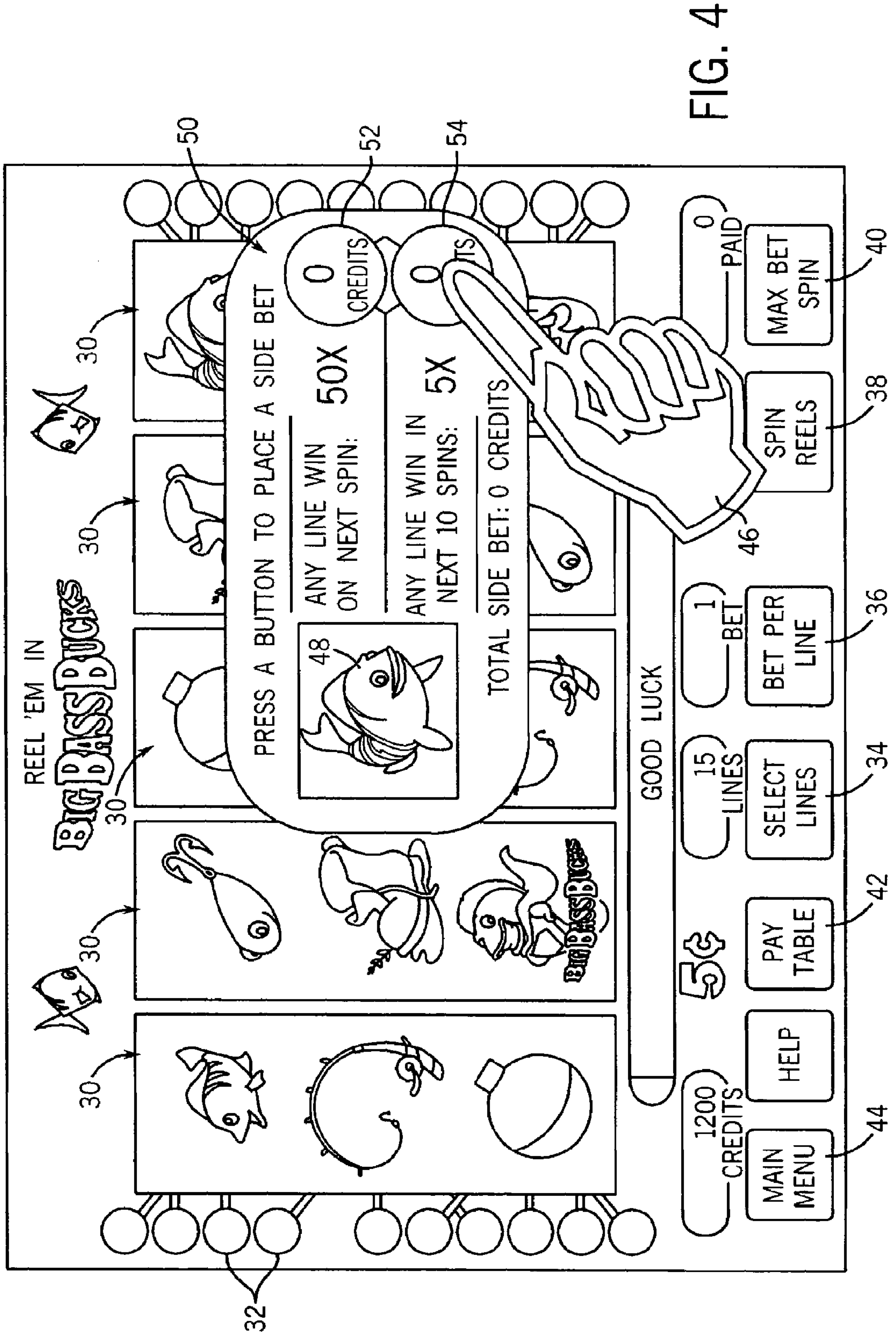
Figure 5:
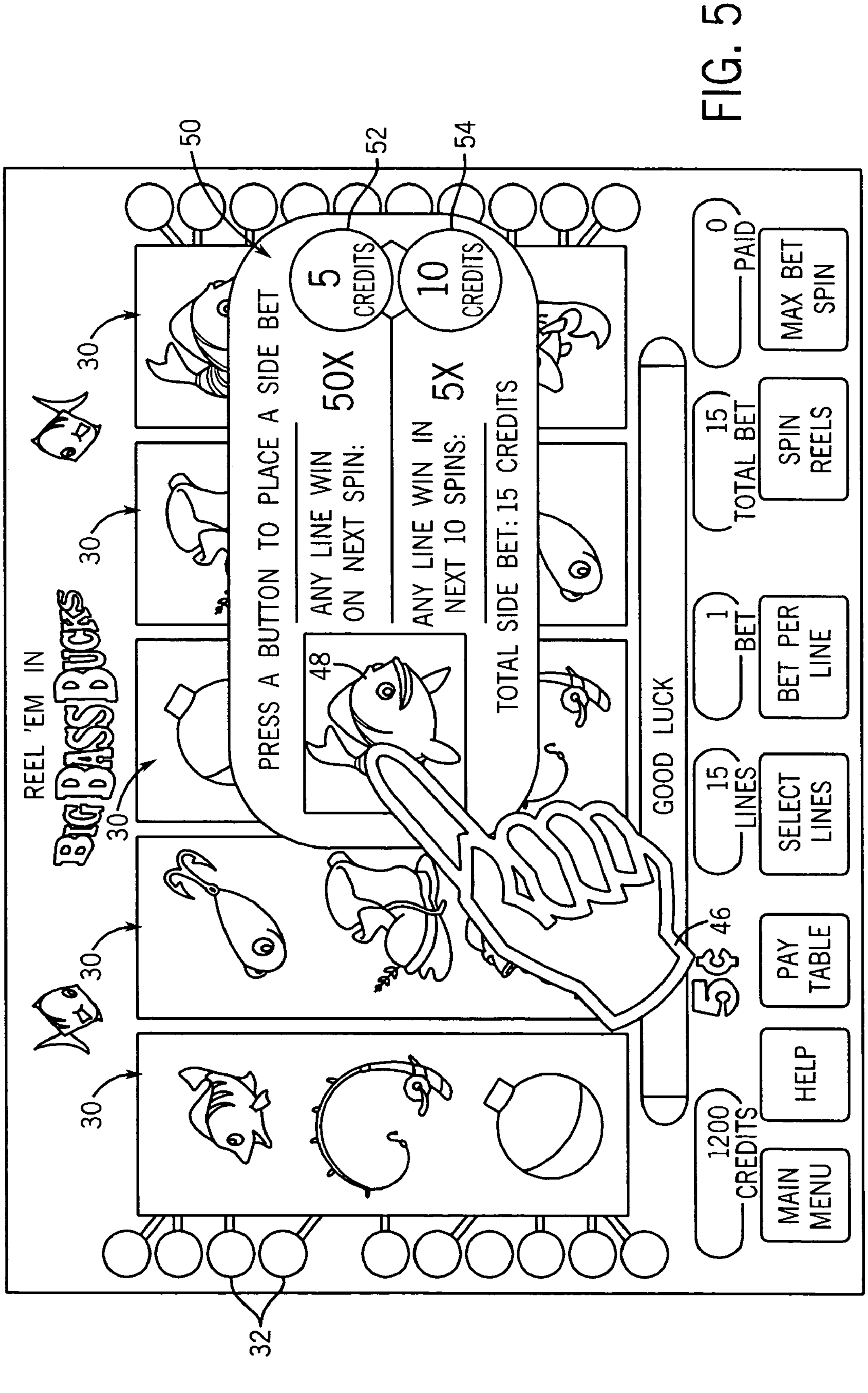
Figure 6:
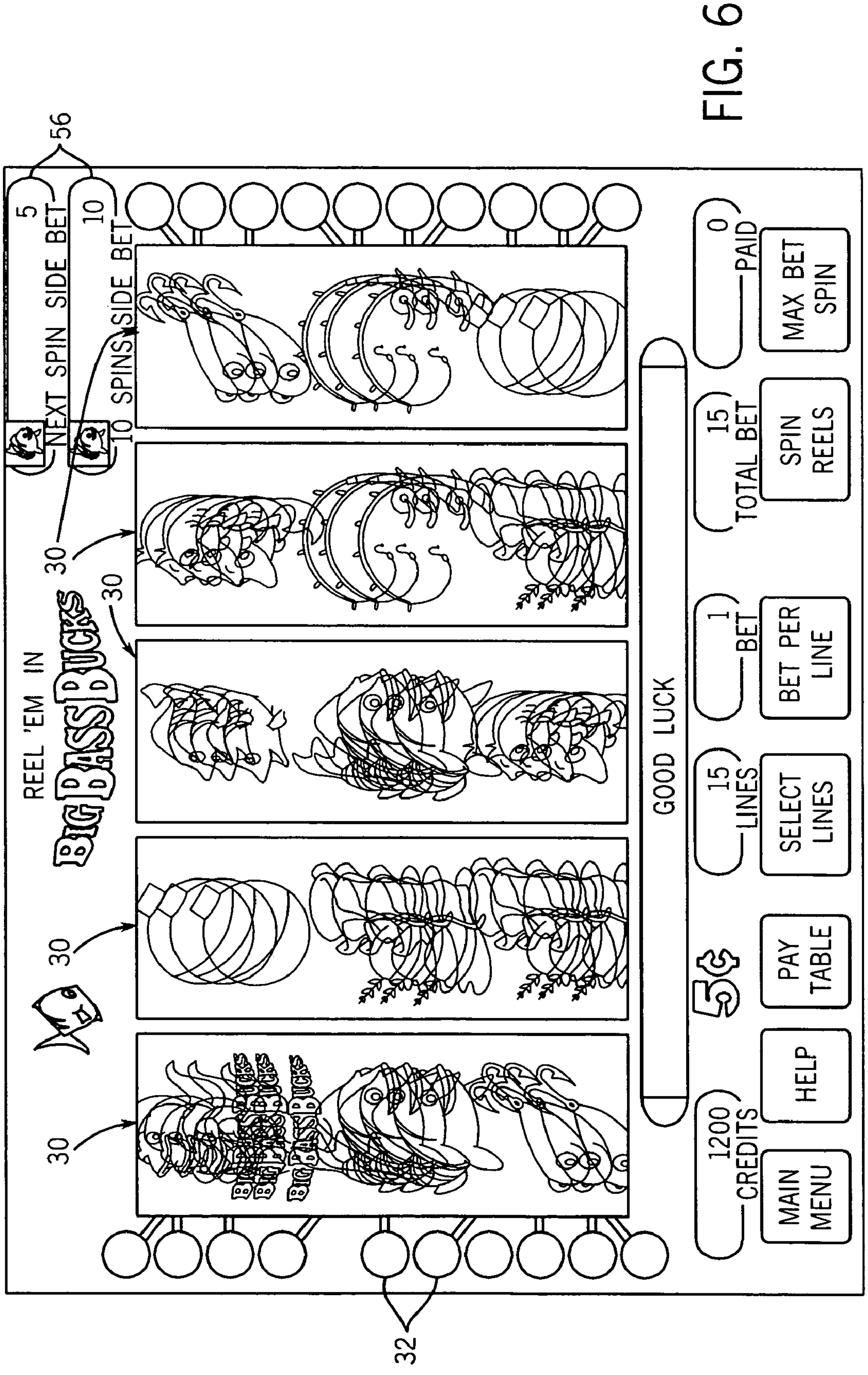
Figure 7:
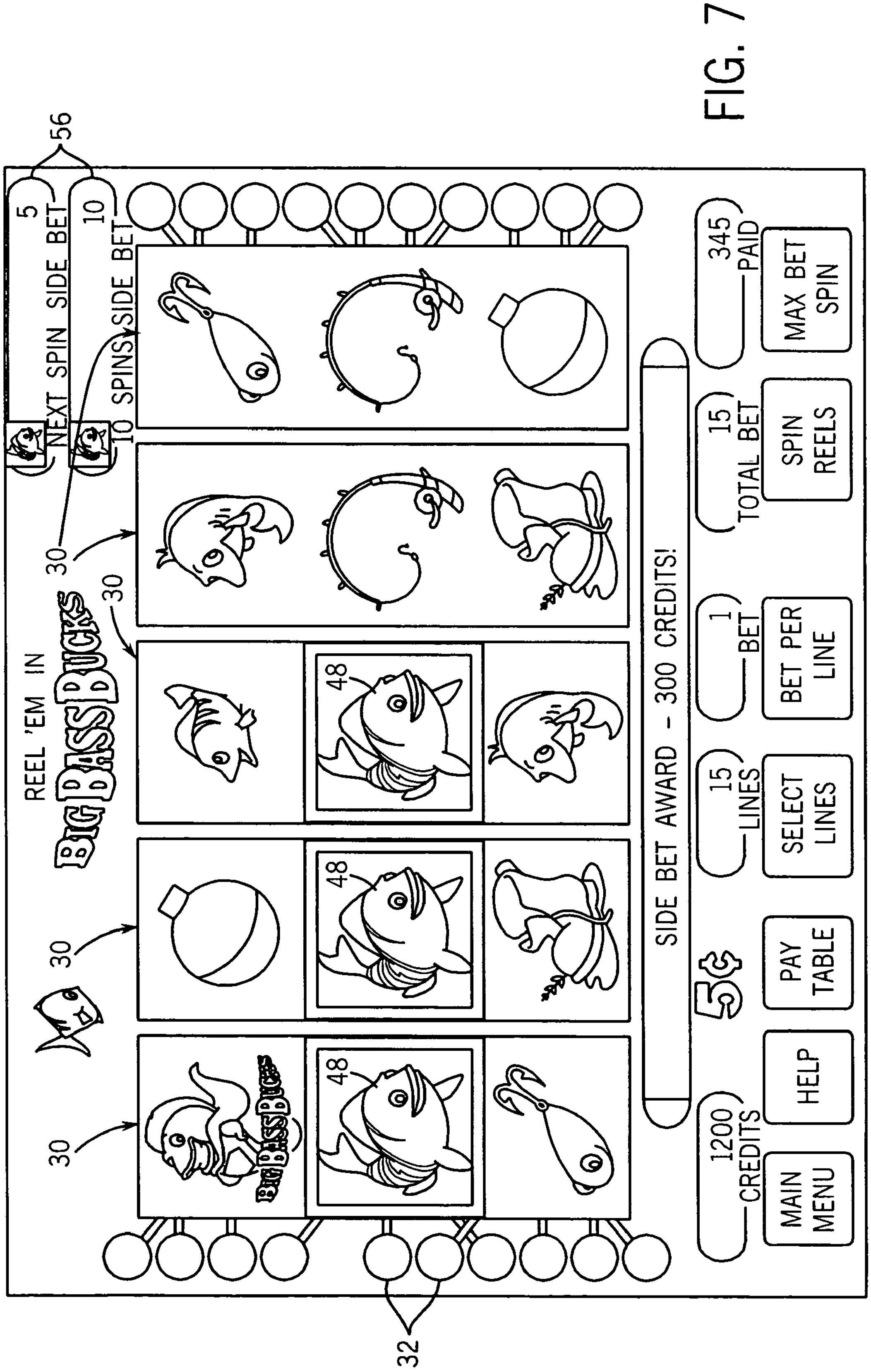

FIGS. 3 through 7 are display images showing the use of a pop-up window to make a side-bet. Before spinning the reels 30, the player can touch any symbol to place a side-bet (FIG. 3). In the illustrated example, the player touches a big fish symbol 48. Touching the big fish symbol 48 opens a pop-up window 50 (FIG. 4). Using the pop-up window 50, the player can then wager that the big fish symbol 48 will yield a line pay either (i) on the next reel spin (which pays the "next spin" side-bet multiplied by 50) by touching an onscreen button 52 or (ii) at any point during the next ten reel spins (which pays the "next 10 spins" side-bet multiplied by 5) by touching an onscreen button 54. In the illustrated example, the player wagered five credits that the big fish symbol 48 will yield a line pay on the next reel spin and ten credits that the big fish symbol 48 will yield a line pay at least once during the next ten reel spins (FIG. 5). When the player has finished placing side-bets, side-bet meters 56 appear on the display to indicate the placed side-bets (FIG. 6). The player may set the reels 30 in motion by touching the "Spin Reels" key 38 or, if the player wishes to bet the maximum amount per line, by touching the "Max Bet Spin" key 40. FIG. 6 depicts the reels 30 in motion. In the illustrated example, the reels 30 stop with three big fish symbols 48 along an active pay line 32 (FIG. 7). Therefore, in addition to a standard payout of 45 credits as determined by a standard pay table for the game, the player is also awarded a side-bet award of 300 credits. The side-bet award includes 250 credits (=5×50) for the "next spin" side-bet and 50 credits (=10×5) for the "next 10 spins" side-bet.

Figure 8:
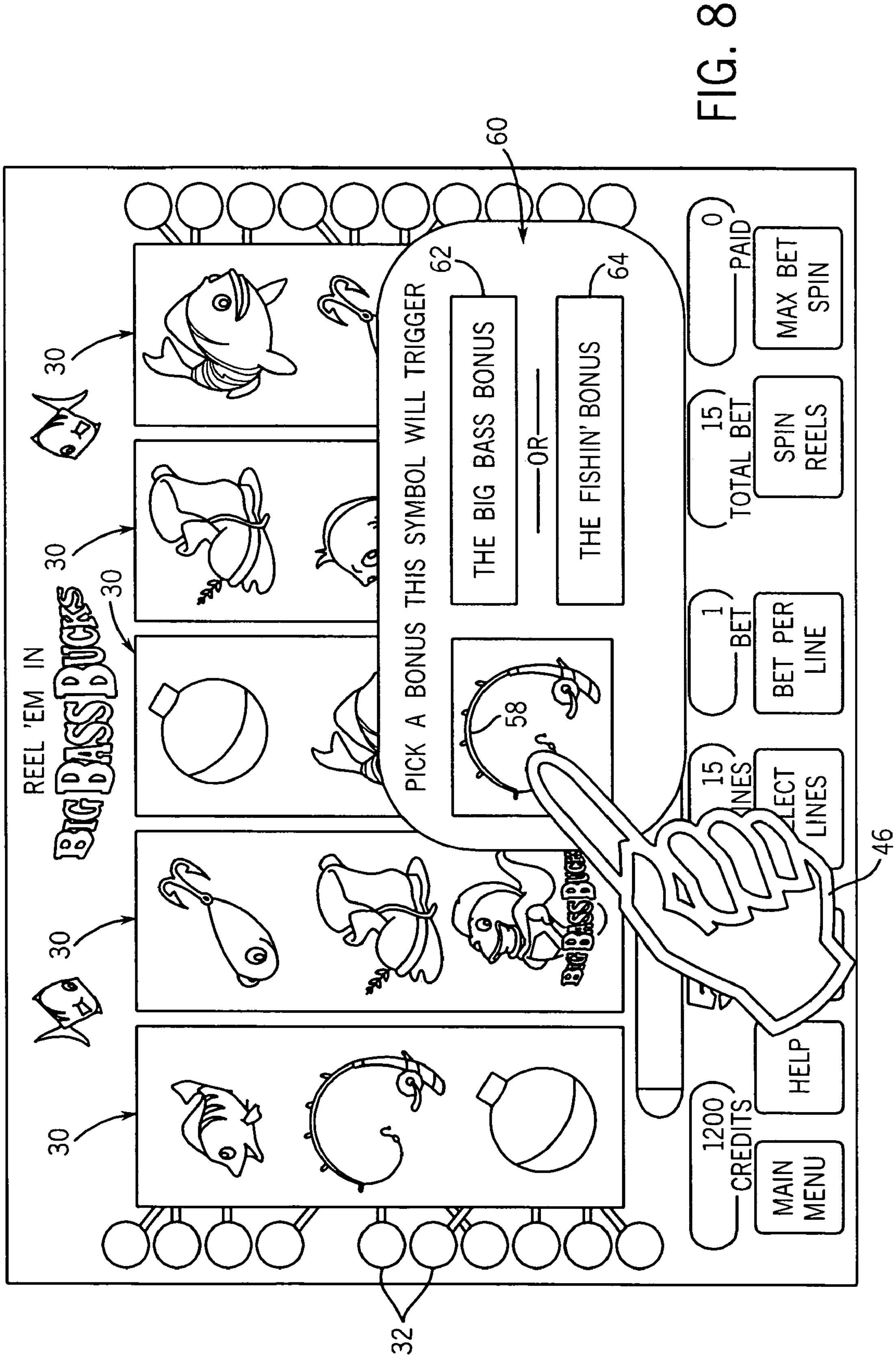
FIG. 8 is a display image showing the use of a pop-up window to select a bonus event to be triggered by a selected symbol.

FIG. 8 is a display image showing the use of a pop-up window to select a bonus event to be triggered by a selected symbol. Before spinning the reels 30, the player can touch any symbol. Alternatively, the player may only be allowed to select certain symbols that are predefined as capable of triggering bonus events. In the illustrated example, the player touches a fishing reel symbol 58. Touching the fishing reel symbol 58 opens a pop-up window 60. Using the pop-up window 60, the player can then select a bonus event (e.g., The Big Bass Bonus or The Fishin' Bonus) to be triggered by the fishing reel symbol 58. In the illustrated example, the player touches an onscreen button 62 to select The Big Bass Bonus or an onscreen button 64 to select The Fishin' Bonus. If the start-feature outcome is, for example, a combination of at least three fishing reel symbols 58 along an active pay line, then the appearance of this combination along an active pay line during the basic reel slot game will trigger the bonus event selected via the pop-up window 60.

Figure 9:
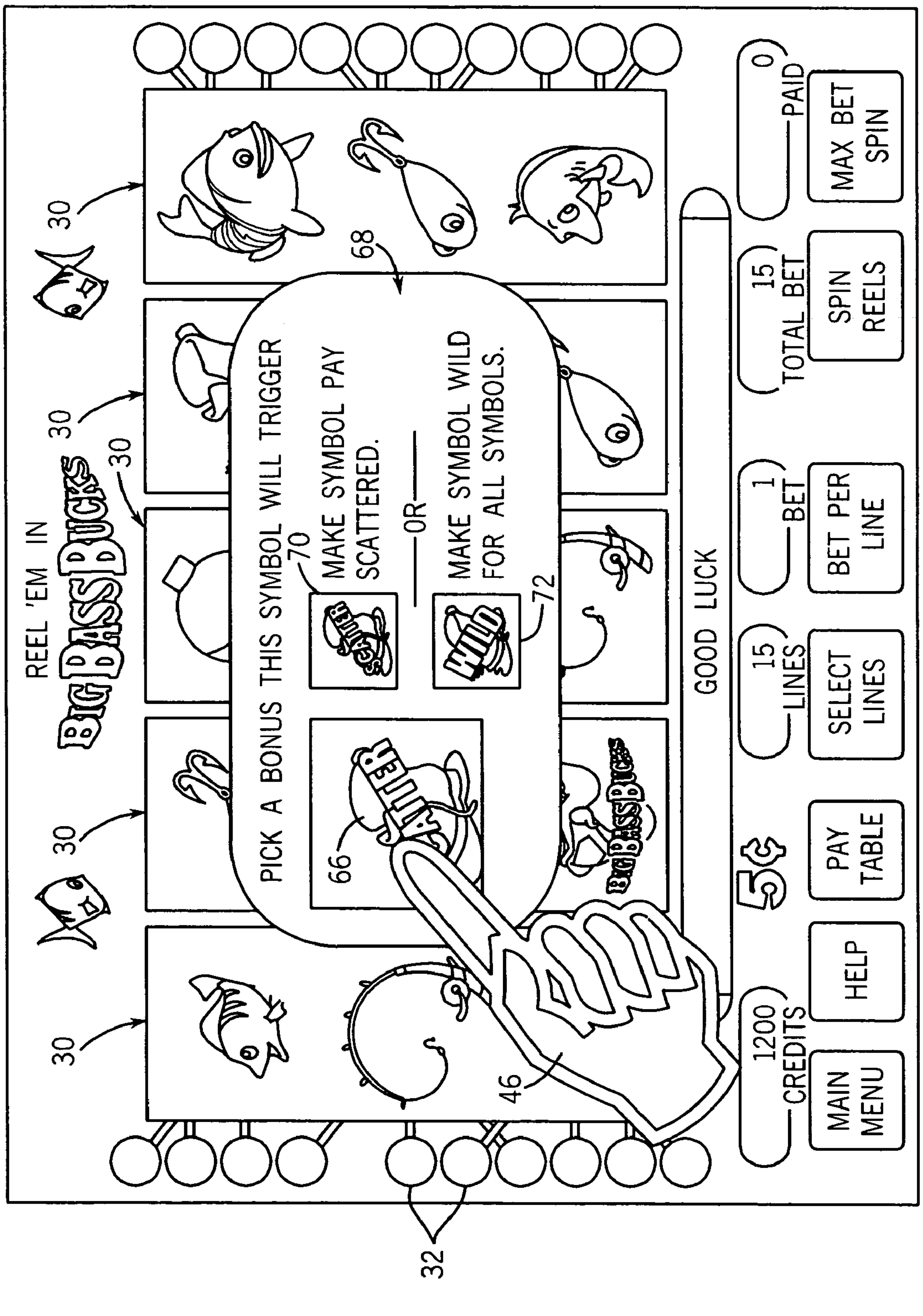
FIG. 9 is a display image showing the use of a pop-up window to select how a selected symbol will be evaluated during a basic reel slot game.

FIG. 9 is a display image showing the use of a pop-up window to select how a selected symbol will be evaluated during the basic reel slot game. A symbol may, for example, be evaluated as a scatter, wild, left-to-right line pay, right-to-left line pay, or a bonus trigger. All, some, or none of these functions may be available for a selected symbol. Before spinning the reels 30, the player can touch any symbol. In the illustrated example, the player touches an old boot symbol 66. Touching the old boot symbol 66 opens a pop-up window 68. Using the pop-up window 68, the player can then select how the old boot symbol 66 will be evaluated (e.g., scatter pay or wild) during the basic reel slot game. In the illustrated example, the player touches an onscreen button 70 to make the old boot symbol 66 pay scattered, i.e., the appearance of a winning combination of old boot symbols 66 on the stopped reels 30 during the basic reel slot game results in an award whether or not the symbols appear along an active pay line 32. The player touches the onscreen button 72 to make the old boot symbol 66 wild (substitute) for other symbols during the basic reel slot game.

Figure 10:
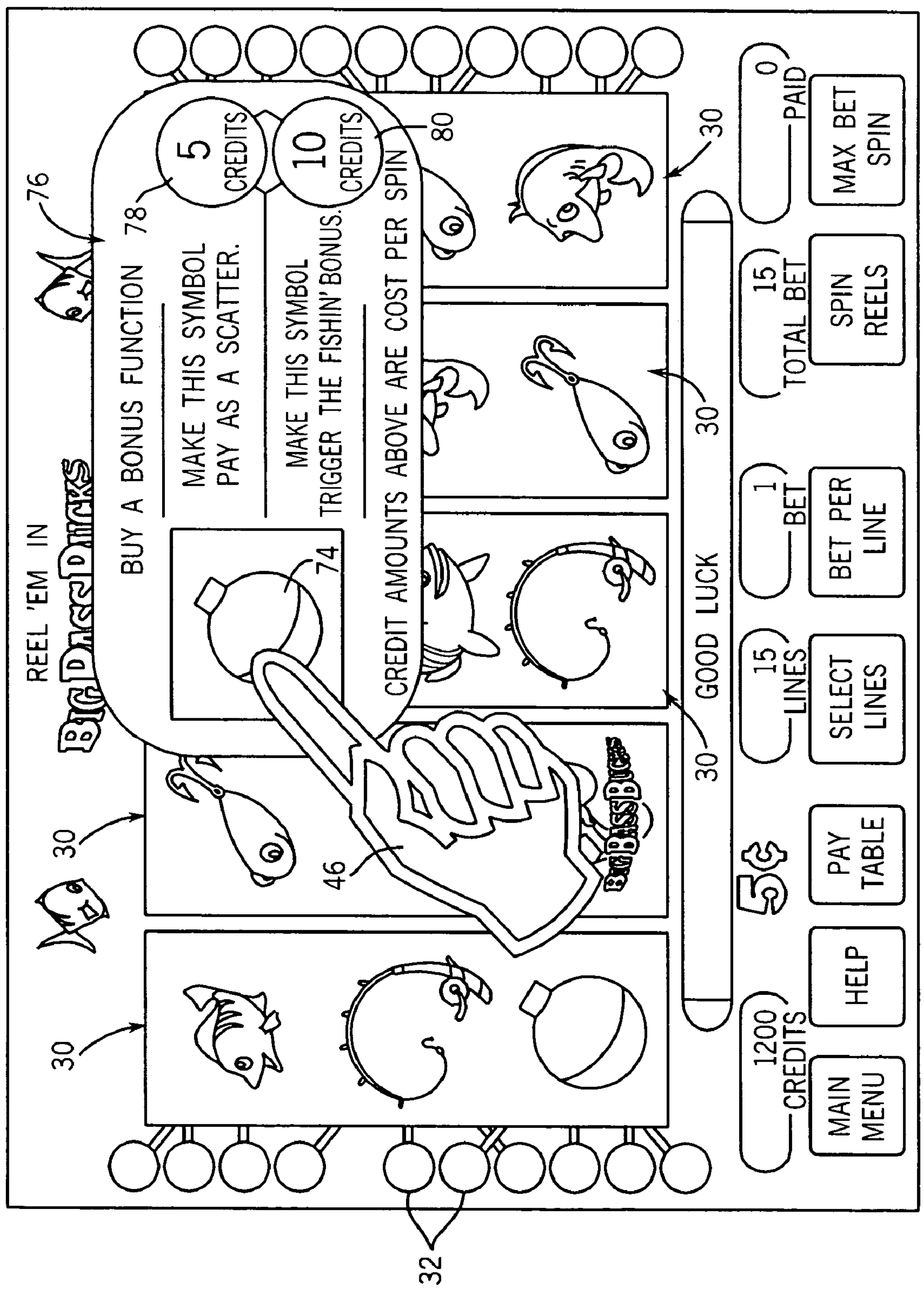
FIG. 10 is a display image showing the use of a pop-up window to purchase a bonus function to be associated with a selected symbol.

FIG. 10 is a display image showing the use of a pop-up window to purchase a bonus function to be associated with a selected symbol. The bonus function is preferably in addition to the standard function for the selected symbol. As described in connection with FIG. 9, possible bonus functions may, for example, include evaluation of the selected symbol as a scatter, wild, left-to-right line pay, right-to-left line pay, or a bonus trigger, or having additional winning combinations on the pay table. All, some, or none of these functions may be available for a selected symbol. Before spinning the reels 30, the player can touch any symbol. In the illustrated example, the player touches a bobber symbol 74. Touching the bobber symbol 74 opens a pop-up window 76. Using the pop-up window 76, the player can then purchase a bonus function (e.g., scatter pay or trigger for The Fishin' Bonus) for the bobber symbol 74. In the illustrated example, the player touches an onscreen button 78 to make the old boot symbol 66 pay as a scatter and the onscreen button 80 to make the old boot symbol 66 operate as a trigger for the Fishin' Bonus. The purchase price for the selected bonus function may be a predetermined number of credits or any number of credits selected by the player. The credit amount may need to be greater than a predetermined minimum (e.g., 5 credits) and, with each press of the applicable button 78 or 80, may increment in predetermined steps. The credit amount may be the cost per spin of the reels 30 as illustrated, or may be the cost for a block of spins of the reels 30. If the selected bonus function occurs during the basic reel slot game, the award for the occurrence of the bonus function is multiplied by the number of credits used to purchase the bonus function.

Figure 11:
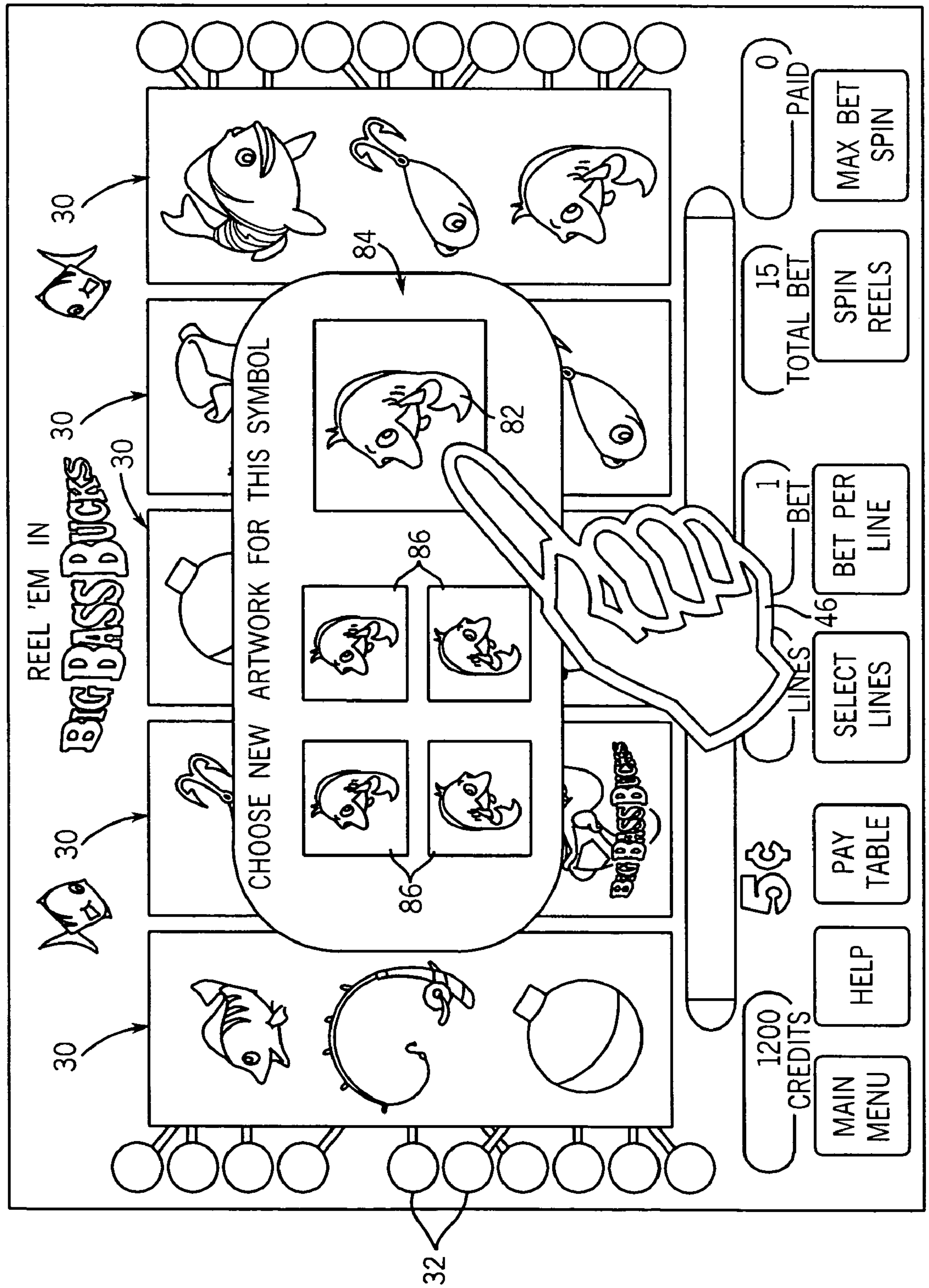
FIG. 11 is a display image showing the use of a pop-up window to select new artwork for a selected symbol.

FIG. 11 is a display image showing the use of a pop-up window to select new artwork for a selected symbol. The new artwork may entail changes to the background, color, shape, orientation, or other graphic attribute of the selected symbol. Before spinning the reels 30, the player can touch any symbol. In the illustrated example, the player touches a medium fish symbol 82. Touching the medium fish symbol 82 opens a pop-up window 84. Using the pop-up window 84, the player can then select new artwork for the medium fish symbol 82 from a plurality of possible artwork schemes denoted by respective onscreen buttons 86. The player selects one of the artwork schemes 86 by touching it.

Figure 12:
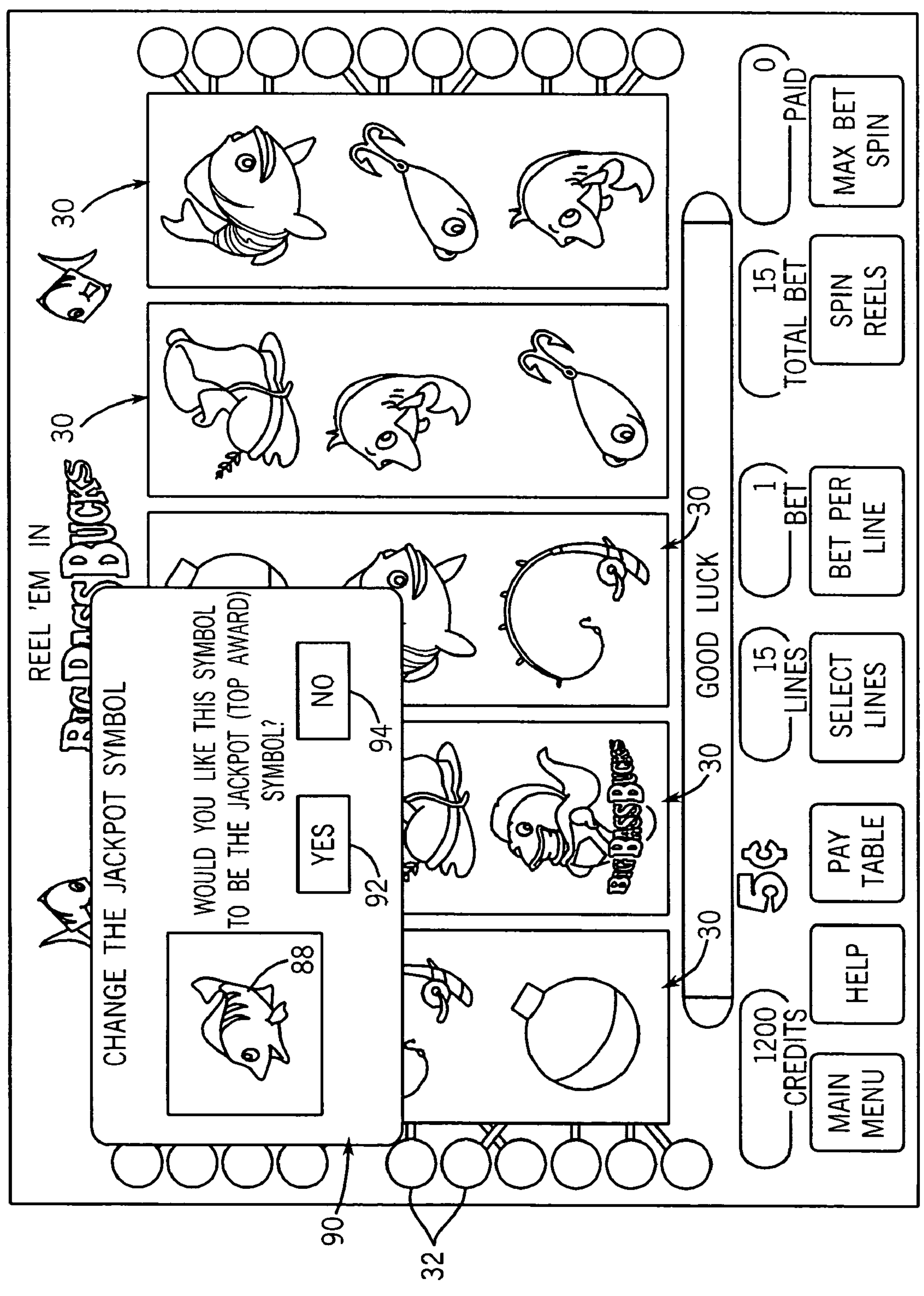
FIG. 12 is a display image showing the use of a pop-up window to change a selected symbol's position in a pay hierarchy, e.g., changing the selected symbol to the jackpot (top award) symbol.

FIG. 12 is a display image showing the use of a pop-up window to change a selected symbol's position in a pay hierarchy, e.g., changing the selected symbol to the jackpot (top award) symbol. Before spinning the reels 30, the player can touch any symbol. Alternatively, the player may only be allowed to select certain symbols that are predefined as capable of serving as the jackpot symbol. In the illustrated example, the player touches a small fish symbol 88. Touching the small fish symbol 88 opens a pop-up window 90. Using the pop-up window 90, the player can then press a "yes" button 92 to make the small fish symbol 88 the jackpot symbol or the "no" button 94 to keep the small fish symbol 88 in its existing position within the pay hierarchy. Although the illustrated example only allows the player to change a selected symbol to the jackpot symbol, it should be understood that pop-up windows could also be used to configure the selected symbol so that it is in any desired position within the pay hierarchy.

Figure 13:
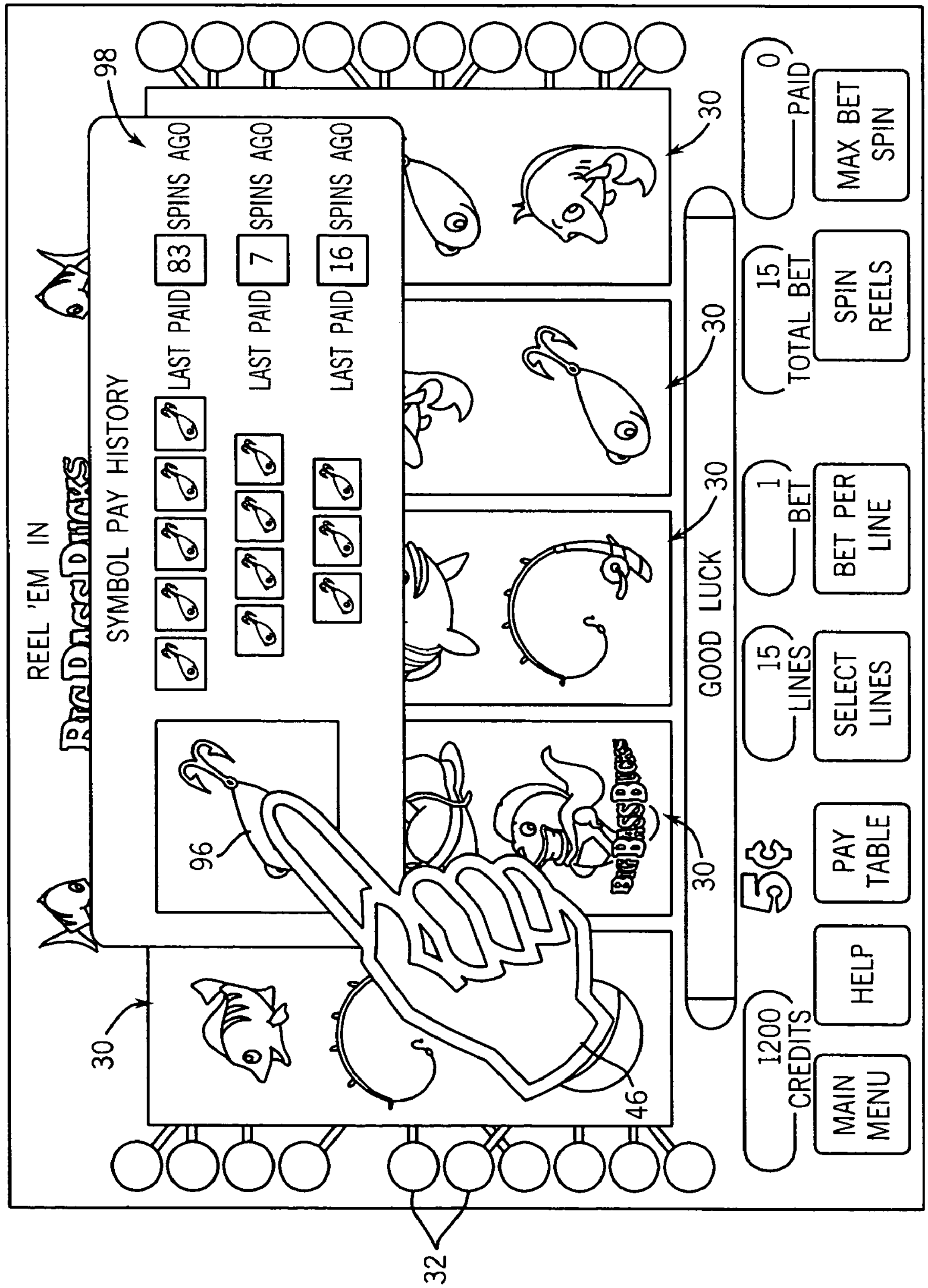
FIG. 13 is a display image showing the use of a pop-up window to view a pay history for a selected symbol.

FIG. 13 is a display image showing the use of a pop-up window to view a pay history for a selected symbol. Before spinning the reels 30, the player can touch any symbol. Alternatively, the player may only be allowed to select certain symbols that are predefined as capable of displaying their pay history. In the illustrated example, the player touches a lure symbol 96. Touching the lure symbol 96 opens a pop-up window 98. The pop-up window 98 provides information about when different winning combinations including the lure symbol 96 last occurred. In the illustrated example, a winning line pay of five lure symbols 96 last occurred 83 spins ago; a winning line pay of four lure symbols 96 last occurred 7 spins ago; and a winning line pay of three lure symbols 96 last occurred 16 spins ago.

The information in the pay history may vary. For example, the pay history may include the number of occurrences of each winning combination in a predetermined or player-selected number of prior spins. Also, the pay history may include time interval information showing an amount of time elapsed since each winning combination last occurred. Each winning combination may be associated with a respective timer counting up from 00:00:00:00 (i.e., days, hours, minutes, seconds):

| | | | | | |
|---|---|---|---|---|---|
| lure | lure | lure | lure | lure | 00:00:17:10 |
| lure | lure | lure | lure | — | 00:00:01:54 |
| lure | lure | lure | — | — | 00:00:03:27 |

Upon the occurrence of one of the winning combinations, the respective timer for that combination is reset to zero. Each timer may track the total real time or the total playing time (with coin-in) elapsed since the associated combination last occurred.

The pay history offers a number of significant advantages. First, the pay history assists in gaining the trust of players who perceive gaming machines as manipulating the probabilities in their own favor. The pay history serves as an accounting of recent plays and may reassure players that the machine does, in fact, pay out. For more sophisticated players, the pay history may even serve as evidentiary proof of the math and pay tables underlying the game. Second, the pay history serves as a powerful psychological tool that can take advantage of player perceptions. The pay history communicates information indicative of past outcomes without requiring a player to witness the machine over an extended period of time. Based on this information, the player may perceive the machine or certain outcomes to be "hot" or "cold" or due to hit and make his/her play decisions accordingly. The pay history subtly encourages players to strategize their play and alter their play strategies from the norm. For example, in the case of machines attached to progressive jackpots or large jackpot giveaways, on the one hand some players may avoid such machines because they do not believe the jackpots to be achievable. On the other hand, some players may gravitate toward such machines when they believe the jackpot is due to hit. The pay history may communicate to players when the last jackpot occurred, thereby providing players with a psychological benefit that the jackpot is achievable and/or is due to hit.

Figure 14:
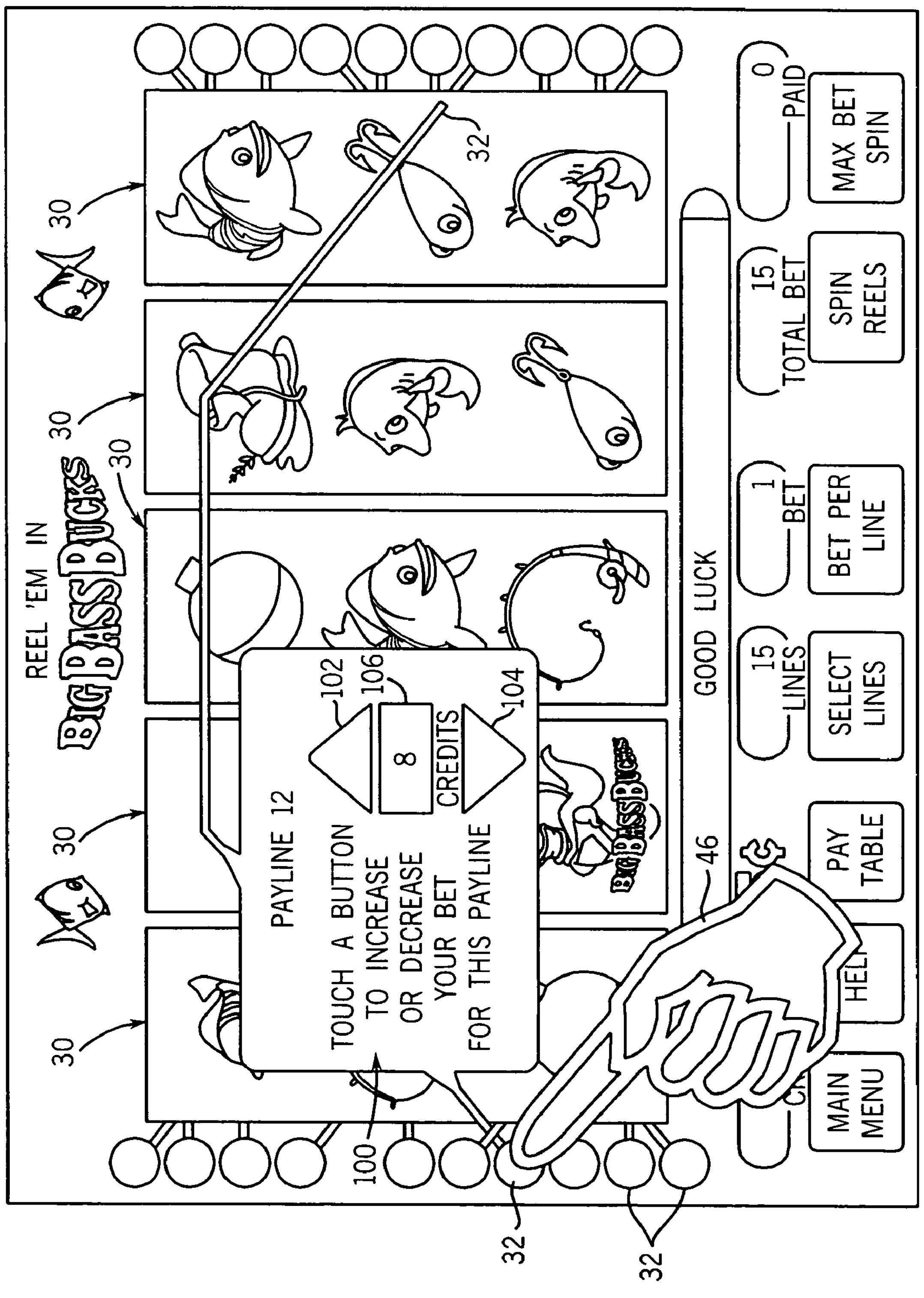
FIG. 14 is a display image showing the use of a pop-up window to adjust a wager on an individual pay line.

FIG. 14 is a display image showing the use of a pop-up window to adjust a wager on an individual pay line. Instead of wagering the same number of credits on each pay line 32 as in most conventional reel slot games, the player can wager any desired number of credits on each pay line 32. While placing his or her wager before spinning the reels 30, the player can touch the bubble at the end of any pay line 32. In the illustrated example, the player touches a bubble at the end of a roof-shaped pay line 32. Touching the bubble opens a pop-up window 100. Using the pop-up window 100, the player can increase his/her wager for that pay line 32 by pressing an "up" arrow 102 or decrease his/her wager for that pay line 32 by pressing a "down" arrow 104. The pop-up window 100 may present other interfaces, such as an onscreen numerical keypad, for adjusting the wager on a selected pay line 32.

As described above in connection with FIGS. 3 through 7, pop-up windows may be used to allow a player to make a side-bet. Placing a side-bet utilizing the pop-up window enables the player to make an additional wager to "purchase" one of any number of game enhancements or make an additional wager that the game outcome will include a particular symbol or symbol combination, depending on the side-bet scheme enabled for a particular gaming machine. For example, side-betting schemes utilizing pop-up windows may allow a player to (1) increase his/her odds to trigger bonus game play, (2) increase the value payout associated with bonus game play, (3) both increase the odds of triggering bonus game play and increase associated value payouts, (4) increase the value payouts associated with winning outcomes during basic game play, for example, to "buy a multiplier" (BAM) that would multiply any value payout associated with a winning game outcome by a predetermined amount that is based on the side-bet amount, to side-bet that a symbol combination will appear in any pay line or in a particular pay line, or to side-bet that a particular symbol will appear in the game outcomes. Side-betting schemes utilizing pop-up windows may also allow a player to (5) ensure receipt of a value payout in a predetermined amount for non-winning outcomes, (6) activate additional game features, (7) after a partial game outcome is displayed, (i) increase the value payouts associated with winning outcomes during basic game play or (ii) invoke a right-to-left line pay, (8) activate an extra wild symbol that is capable of being repositioned within an outcome symbol array to yield a higher value payout, (9) in the case of a slot game, providing a possibility of an additional movement of a stopped reel to reposition an extra reel symbol, provided above or below the outcome symbol array, into the outcome symbol array to yield an increased value payout, or (10) providing a possibility of generating an extra pay line that includes an extra reel symbol, provided above or below the outcome symbol array, if the extra pay line results in an increased value payout, to name a few. In addition, placing more than one side-bet via more than one pop-up window may enable the player to "purchase" more than one game enhancement.

To increase coin in revenue, side-betting utilizing a pop-up window is preferably only available to a player when a minimum criteria is met, for example when a maximum bet is placed, or in the case of a slot game, when a maximum number lines are selected for activation. Further, it is contemplated that repeated side-bets utilizing pop-up windows may be placed prior to each game to increase the coin-in revenue per game. A "Repeat the Bet" button may be also provided via the display 12 to allow a player to repeat side-bets.

Upon detecting a first wager from a player to play a wagering game on the gaming machine 10, the CPU 18 enables a side-bet scheme if the first wager includes a minimum criterion. The minimum criteria may vary depending on the type of wagering game. For example, the side-bet scheme may be enabled when the CPU 18 detects that the player has activated the maximum number of lines for a slot game.

When the side-bet scheme is activated, the player may place one or more side-bets via one or more pop-up windows. Each pop-up window is displayed when the CPU 18 detects player selection (via touching) of one of the symbols of the symbol array displayed on the gaming machine. In response to detecting player selection of the symbol, the CPU 18 displays an associated side-bet pop-up window. The associated side-bet pop-up window preferably includes at least one player selectable option. Each player selectable option is associated with a number of winning side-bet outcomes that preferably include occurrences of the selected symbol. A symbol specific pay table may also be displayed in the pop-up window.

The player may select one of the player selectable options offered in the pop-up window by placing a side-bet or "second wager" for an amount displayed, preferably in an amount button, in the pop-up window. The player selects the amount of the second wager by touching the amount button one or more times, depending on the second wager amount desired. The player may then close the pop-up window and select additional symbols to invoke additional pop-up windows, or the player may initiate game play as previously discussed (e.g. spin the reels of a slot game). If the game outcome includes one or more winning symbol combinations, the player is awarded an award, typically game credits. In addition, if the game outcome includes one or more winning side-bet outcomes, the player is awarded a second award, typically game credits, a bonus game, free spins, etc. Separate side-bet meters displayed on the video display inform the player of the side-bet and the status of the side-bet outcome.

In the case of a mechanical spinning reel machine having an overlaid flat panel transmissive display, player selection of a particular side-bet is preferably made via a touch screen button provided by the transmissive display. Alternatively, or in addition to the touch screen buttons, mechanical buttons may be provided on the player control panel 44 to enable player selection of a particular side-bet. Thus, player selection of one or more side bet-options may be made when a player depresses a particular lighted or highlighted mechanical button provided on the player control panel 44.

It is also contemplated that, if activated by an adequate game wager as described above, the side-betting scheme may allow the player may place one or more side-bets after a portion of the game outcome is revealed but before the game outcome is fully revealed to the player. For example, in the case of a five reel video slot game, a partial game outcome may be displayed by stopping the two or three leftmost spinning reels while the remaining reels continue to spin. The player, viewing a partial game outcome may then have an option, via a pop-up window as described above, of placing a second wager to "purchase" a right to left line pay, or placing a second wager to increase or multiply a winning game outcome. If the full game outcome includes one or more winning symbol combinations, the player is awarded a first award and if the full game outcome further includes one or more winning side-bet outcomes, the player is awarded a second award.

Figure 15:
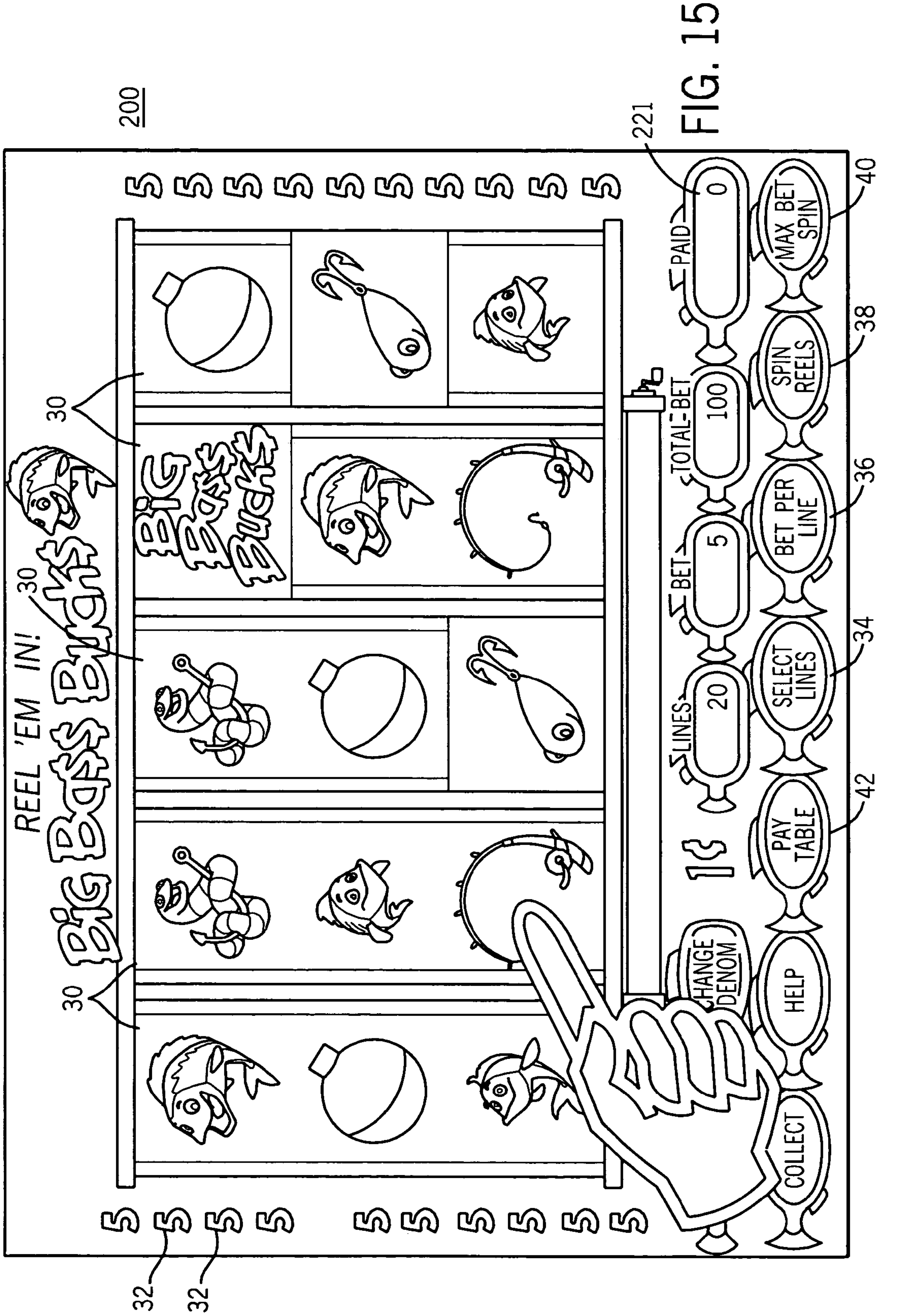
FIGS. 15 through 19 are a series of display images showing the use of a pop-up window to provide a player option to increase the value payout associated with a winning outcome during basic game play.
Figure 16:
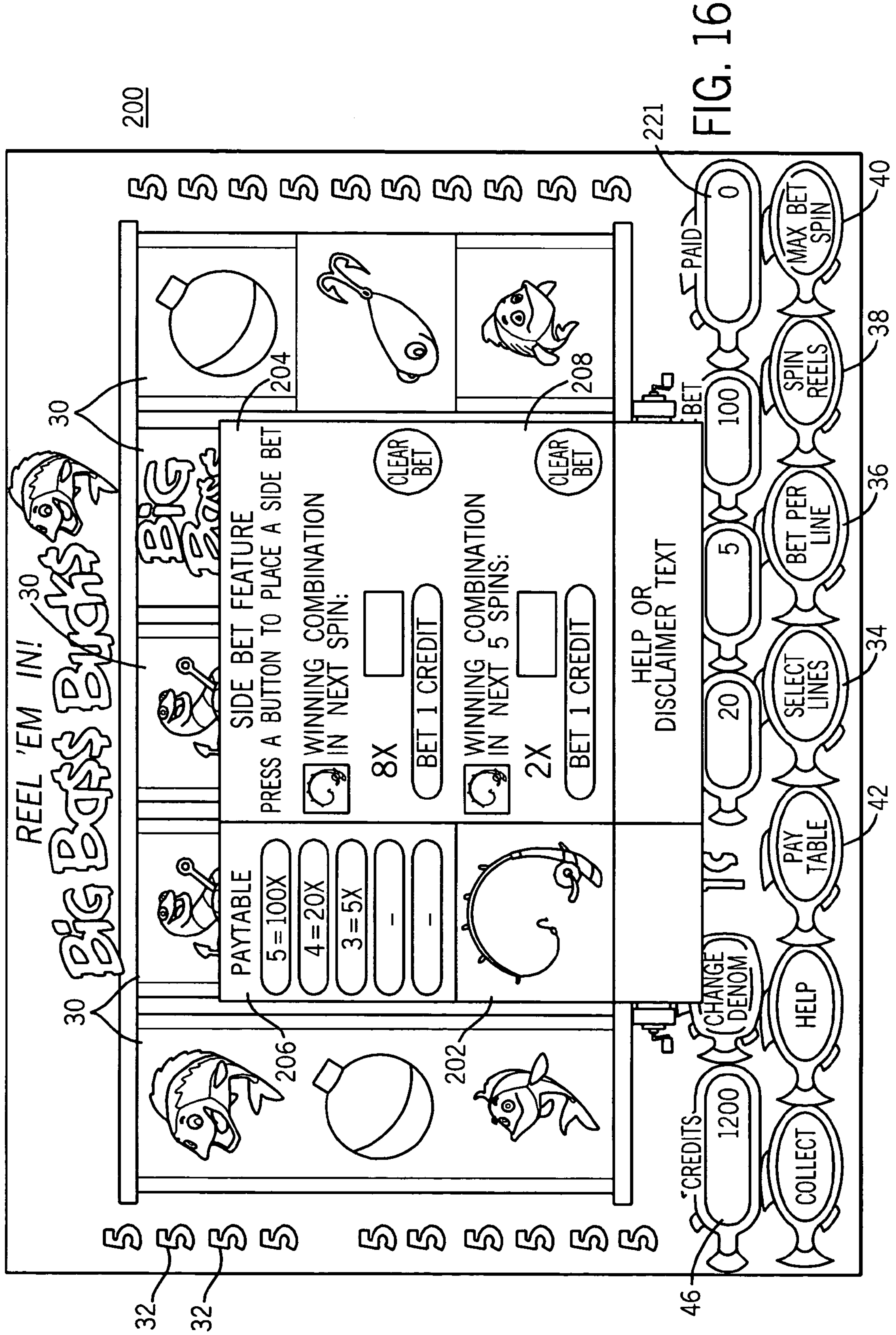

FIGS. 15 through 19 are a series of display images 200 showing the use of a pop-up window to provide an option, that when selected by the player, increases the value payout associated with a winning outcome during basic game play; in this case, provides an option to make a one-spin side-bet. Before spinning the reels 30 and preferably after placing the game wager (i.e., the first wager), the player can touch any symbol to place a side-bet, or second wager (FIG. 15). In the illustrated example, the player touches a fishing pole symbol 202. Touching the fishing pole symbol 202 opens a pop-up window 204 (FIG. 16). The pop-up window 204 includes a symbol-specific pay table area 206 preferably displayed above the fishing pole symbol 202, and a side-bet feature choice area 208 preferably displayed adjacent to the fishing pole symbol 202 and the symbol-specific pay table area 206.

The pop-up symbol-specific pay table area 206 offers a number of advantages to the player as well as the casino operator. First, it enables the player to view the line pays or value payouts associated with occurrences of the fishing pole symbol 202, without having to select the "Pay Table" key 42, causing the CPU 18 to toggle the display 12 between the display image 200 and a pay table image. Second, because the player does not need to toggle back and forth between the display image 200 and the pay table image to view the pay table, the player is able to focus on wagering and associated game play. In addition, other information, for example, Help text, may be displayed via the pop-up side-bet window.

In the illustrated example, the symbol-specific pay table area 206 indicates that an occurrence of three fishing pole symbols 202 along an active pay line will yield a value payout of five times the amount wagered per line (e.g., five times 5 credits), that an occurrence of four fishing pole symbols 202 along an active pay line will yield a value payout of twenty times the amount wagered per line, and that that an occurrence of five fishing pole symbols 202 along an active pay line will yield a value payout of one-hundred times the amount wagered per line.

Figure 17:
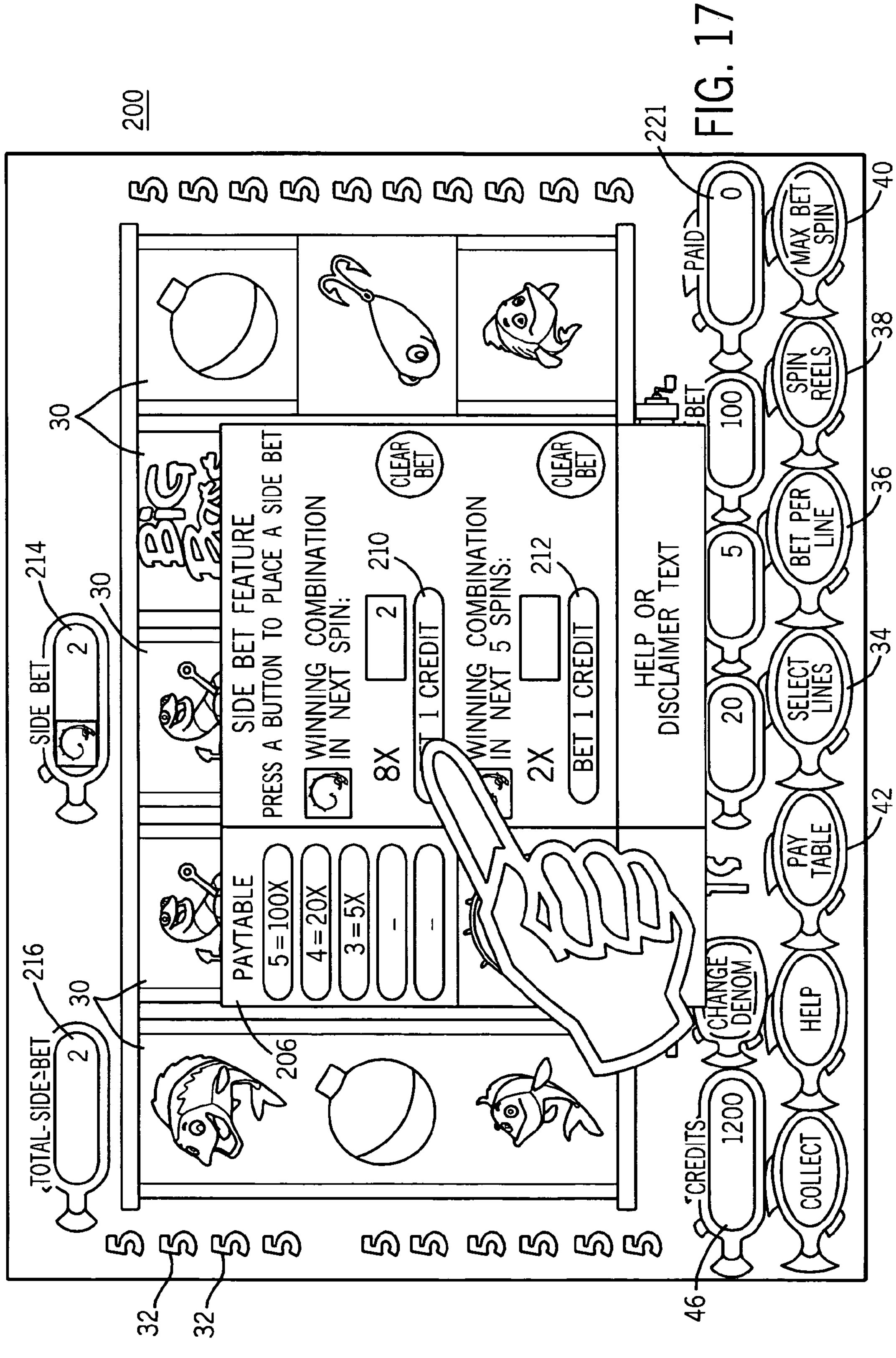

Using the pop-up window 204, the player can then place the side-bet wager that the fishing pole symbol 202 will yield a line pay either (i) on the next reel spin (which pays the "next spin" side-bet multiplied by 8) by touching an onscreen button 210 or (ii) at any point during the next five reel spins (which pays the "next 5 spins" side-bet multiplied by 2) by touching an onscreen button 212. In the illustrated example, the player selects the onscreen button 210 twice indicating a side-bet wager of two credits that the fishing pole symbol 202 will yield a line pay on the next reel spin (FIG. 17).

Upon detecting player selection of the online button 210, the CPU 18 causes one or more symbol-specific side-bet meter(s) 214 and a total side-bet meter 216 to be displayed on the display 12. The symbol-specific side-bet meter(s) 214 indicates the number of side-bet credits wagered for each individual symbol per game. The total side-bet meter 216 indicates a total number of side-bet credits wagered for all individual symbol(s) per game.

Figure 18:
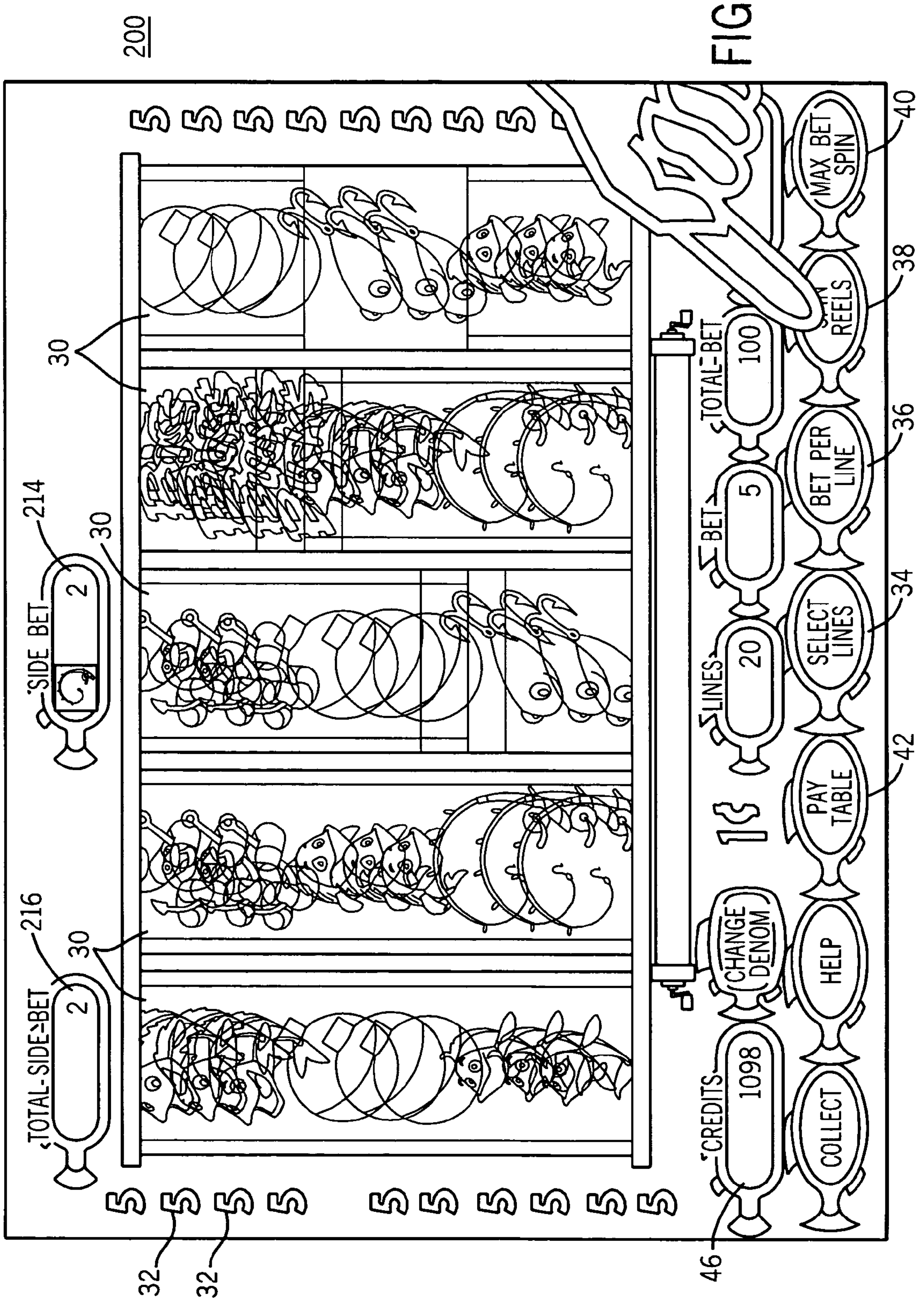

After selecting a number of pay lines to play (e.g., 20 pay lines), a number of credits to wager on each pay line (e.g., 5 credits per pay line) and the side-bet wager, the player may set the reels 30 in motion by touching the "Spin Reels" key 38 or, if the player wishes to bet the maximum amount per line, by touching the "Max Bet Spin" key 40. FIG. 18 depicts the reels 30 in motion. Preferably, no player input is accepted during the reel spin unless the side-betting scheme specifically allows the player to place a side-bet after a partial game outcome is displayed (discussed below). In addition to setting the reels 30 in motion, detection of player selection of either the "Spin Reels" key 38 or the "Max Bet Spin" key 40 causes the credit meter 46 to decrement by the wagered game credit amount and wagered side-bet credit amount. In the illustrated example, the credit meter 46 decrements from 1200 credits to 1098 credits to reflect the 100 credits wagered on the basic game (i.e., the first wager) and the 2 credits wagered on the side-bet (i.e., the second wager).

Figure 19:
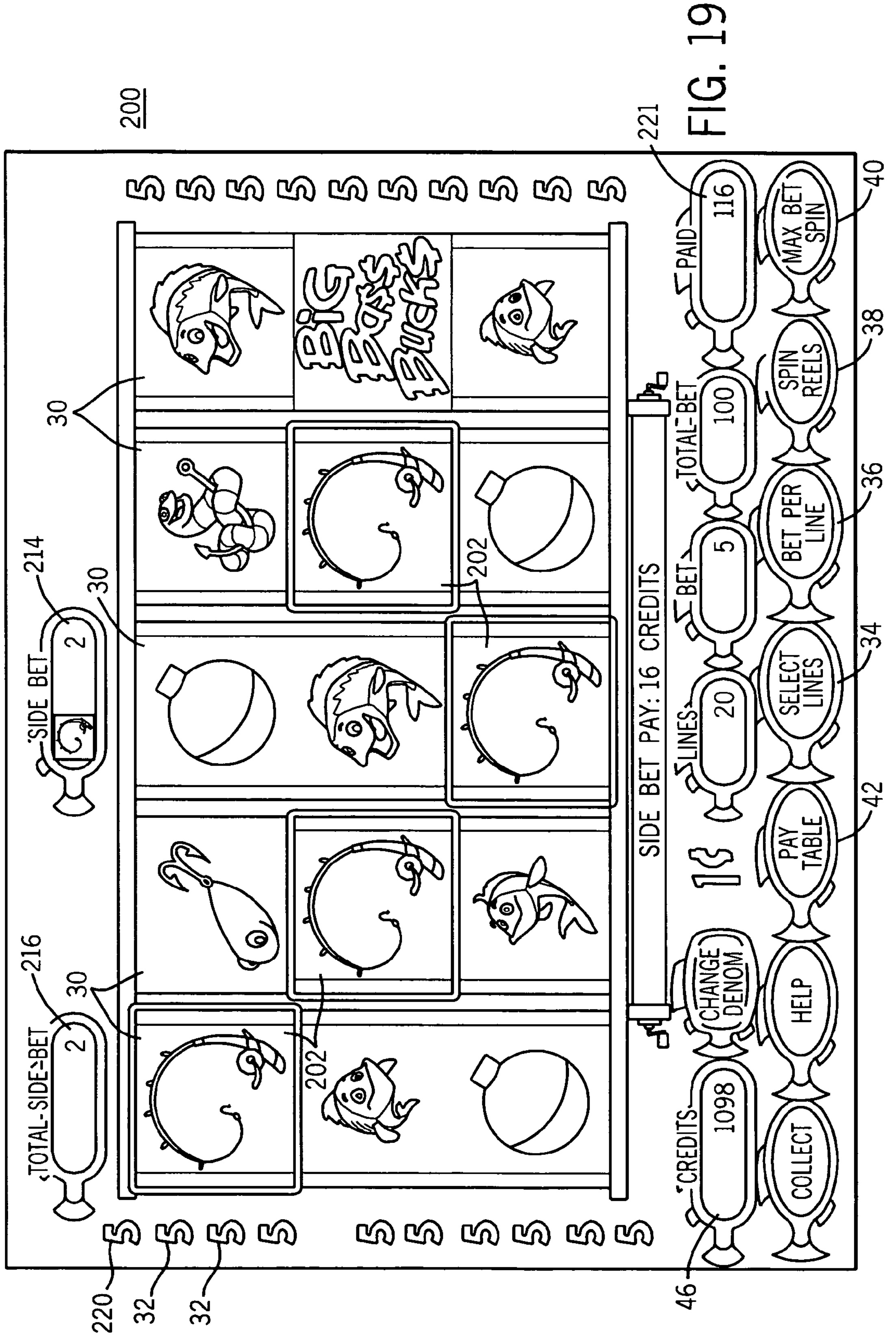

Referring to FIG. 19, the reels 30 stop with four fishing pole symbols 202 along an active pay line 220. Therefore, in addition to a standard payout of 100 credits as displayed by the pop-up symbol-specific pay table area 206 for fishing pole symbol 202, the player is also awarded a side-bet award of 16 credits for a total of 116 credits as indicated on a pay meter 221.

Figure 20:
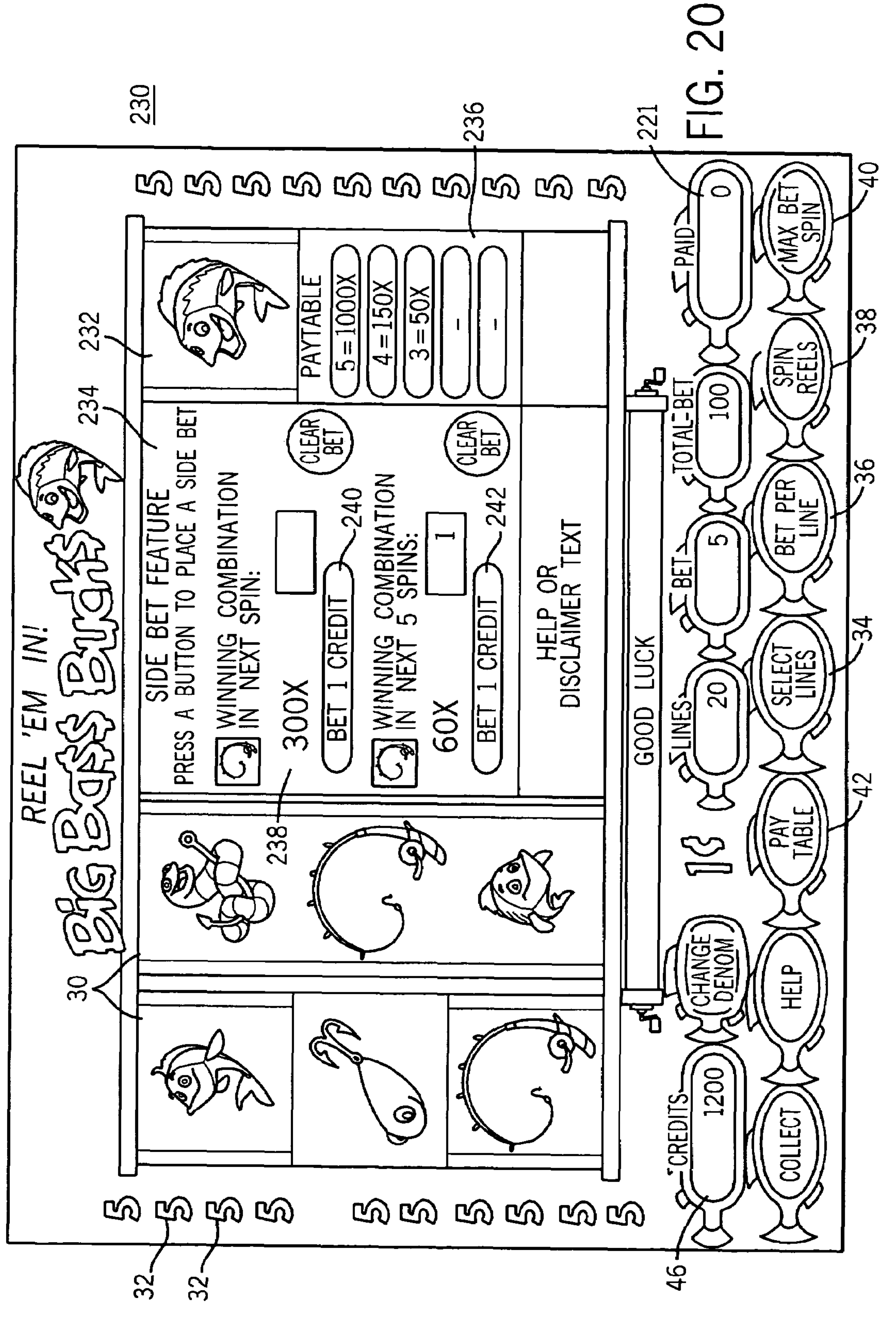
FIGS. 20 through 23 are a series of display images showing the use of a pop-up window to provide another player option to increase the value payout associated with a winning outcome during basic game play.

Similarly, FIGS. 20 through 23 are a series of display images 230 showing the use of a pop-up window to provide another option, that when selected by the player, increases the value payout associated with a winning outcome during basic game play; in this case, provides an to make a five-spin side-bet. Before spinning the reels 30, the player can touch any symbol to place the side-bet (FIG. 20). In the illustrated example, the player touches a bass symbol 232 and opens a pop-up window 234. The pop-up window 234 includes a symbol-specific pay table area 236 preferably displayed below the bass symbol 232, and a side-bet feature choice area 238 preferably displayed adjacent to the bass symbol 232 and the symbol-specific pay table area 236.

In the illustrated example, the symbol-specific pay table area 236 indicates that an occurrence of three bass symbols 232 along an active pay line will yield a value payout of fifty times the amount wagered per line (e.g., fifty times 5 credits), that an occurrence of four bass symbols 232 along an active pay line will yield a value payout of one-hundred and fifty times the amount wagered per line, and that that an occurrence of five bass symbols 232 along an active pay line will yield a value payout of one-thousand times the amount wagered per line.

Using the pop-up window 234, the player can then place a side-bet wager that the bass symbol 232 will yield a line pay either (i) on the next reel spin (which pays the "next spin" side-bet wager multiplied by 300) by touching an onscreen button 240 or (ii) at any point during the next five reel spins (which pays the "next 5 spins" side-bet wager multiplied by 60) by touching an onscreen button 242. In the illustrated example, the player selects the onscreen button 242 once indicating a side-bet wager of one credit that the bass symbol 232 will yield a line pay on one or more of the next five reel spins.

Figure 21:
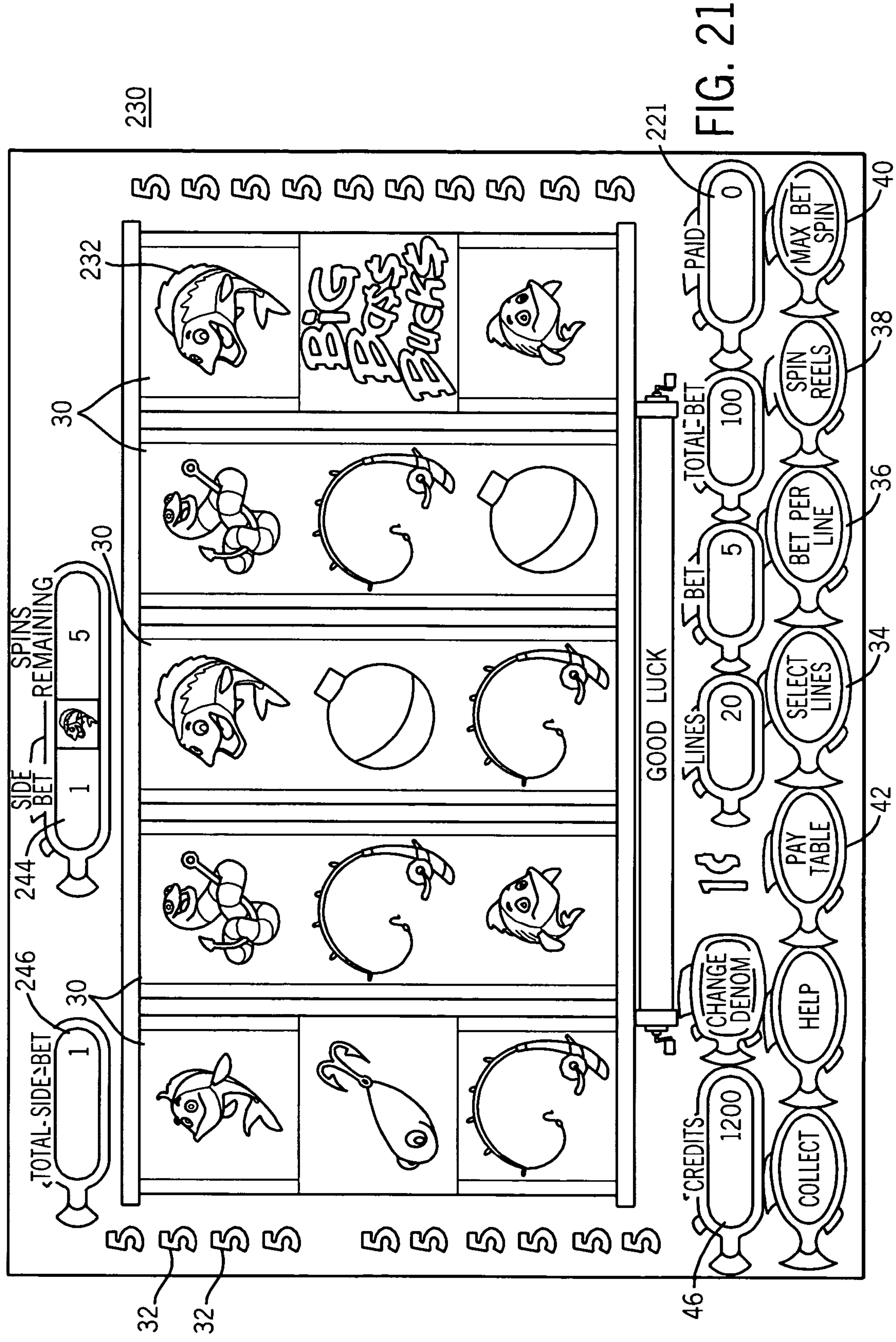
Figure 22:
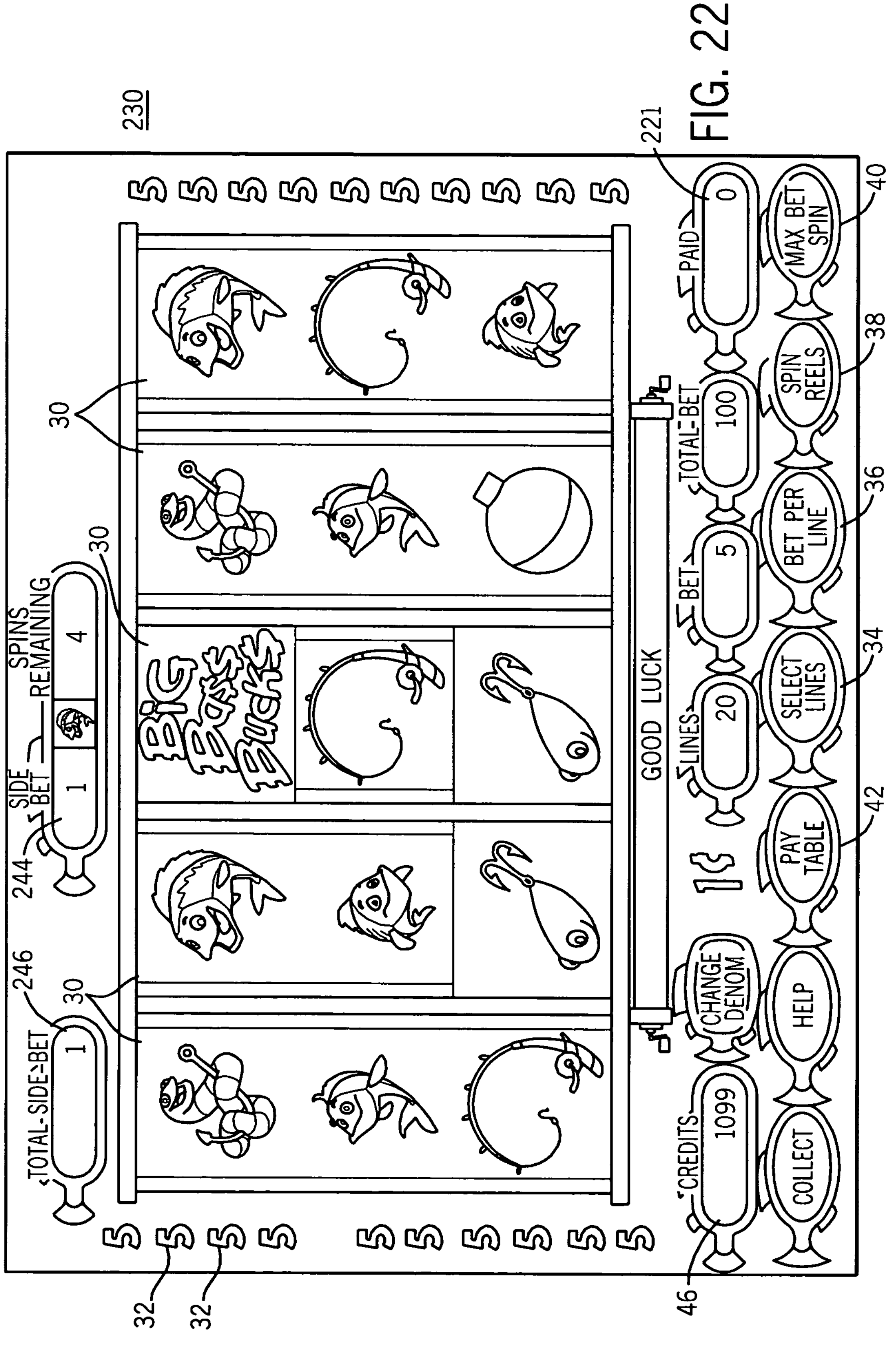

Upon detecting player selection of the online button 242, the CPU 18 causes one or more symbol-specific side-bet meter(s) 244 including a spins-remaining field indicating the number of spins remaining for the side-bet, and a total side-bet meter 246 to be displayed on the display 12 (FIG. 21). The symbol-specific side-bet meter(s) 244 indicates the number of side-bet credits wagered for each individual symbol per game. The total side-bet meter 216 indicates a total number of side-bet credits wagered for all individual symbol(s) per game. Thus, in the illustrated example of FIG. 21, the symbol-specific side-bet meter(s) 244 indicates that a 1-credit side-bet was placed to "purchase" a 60 times multiplier for any line pay associated with winning symbol combinations of the bass symbol 232 occurring during the next five games. To fully collect on the 1 credit side-bet, the player is required to place basic game play wagers for five games. The total wager for the five spins may therefore be 101 credits for spin 1 initiation, 100 credits for spin 2 initiation, 100 credits for spin 3 initiation, 100 credits for spin 4 initiation and 100 credits for spin 5 initiation for a total of 501 credits. In addition, each time a side-bet is placed that spans multiple games, the player is notified if insufficient credits exist to complete the multiple games.

After selecting a number of pay lines to play (e.g., 20 pay lines), a number of credits to wager on each pay line (e.g., 5 credits per pay line) and the side-bet wager, the player may set the reels 30 in motion (not separately illustrated). Preferably, no player input is accepted during the reel spin unless the side-bet scheme specifically allows the player to place a side-bet after a partial game outcome is displayed (discussed below). In addition to setting the reels 30 in motion, detection of player selection of either the "Spin Reels" key 38 or the "Max Bet Spin" key 40 causes the credit meter 46 to decrement by the wagered game credit amount and wagered side-bet credit amount, and causes the spins remaining field of the symbol-specific side-bet meter(s) 244 to decrement by one. In the illustrated example of FIG. 22, the credit meter 46 decrements from 1200 credits to 1099 credits to reflect the 100 credits wagered on the basic game and the 1 credit wagered on the side-bet. No winning symbol combinations along an active pay lines resulted. Accordingly, no credits are paid to the player and the spins-remaining field of the symbol-specific side-bet meter(s) 244 reflects that four spins remain on the five spin side-bet.

Figure 23:
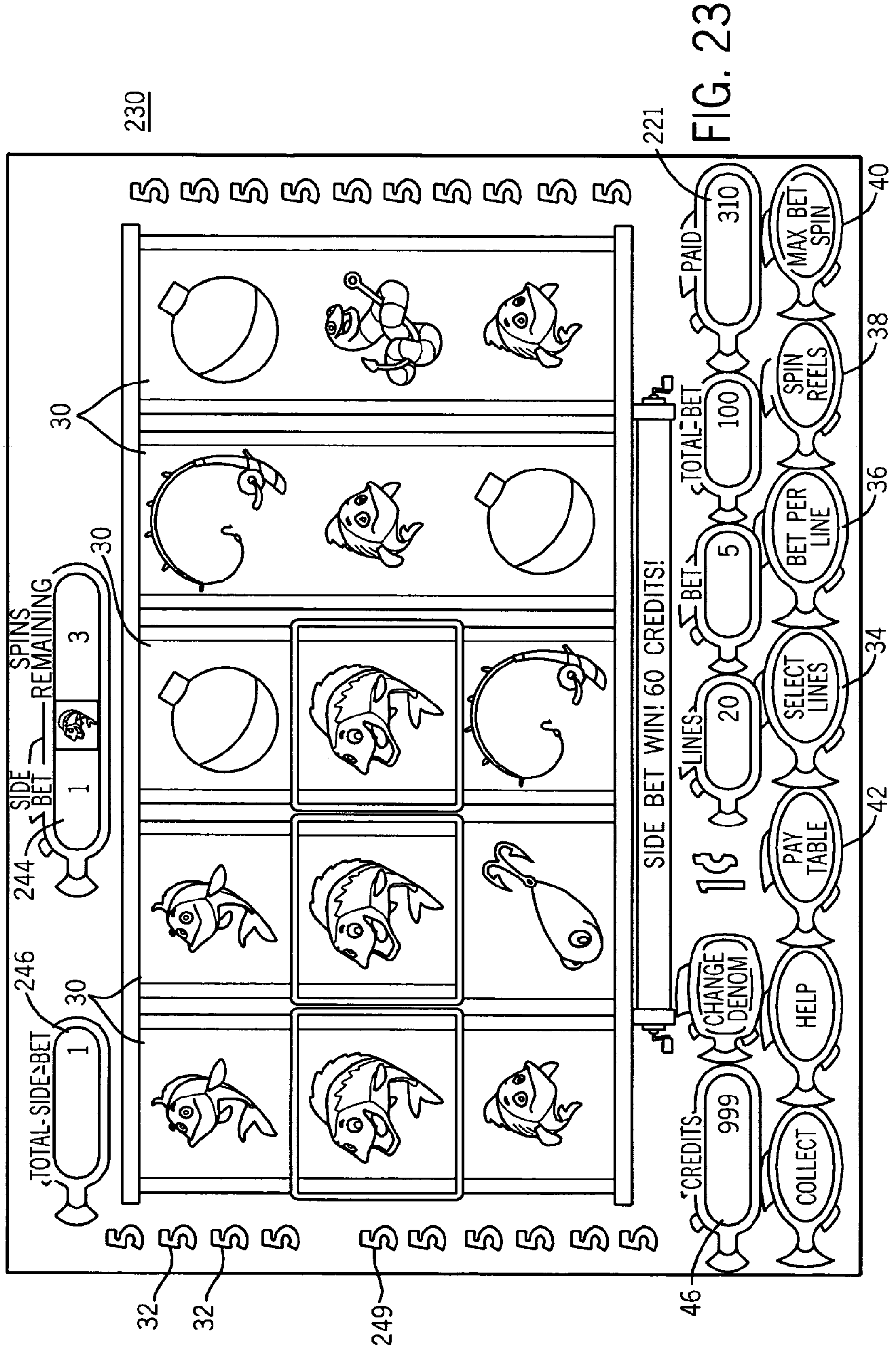

After again selecting the number of pay lines to play (e.g., 20 pay lines) and the number of credits to wager on each pay line for game two (e.g., 5 credits per pay line), the player may set the reels 30 in motion. As illustrated in FIG. 23, the reels 30 stop with three bass symbols 232 along an active pay line 249. Therefore, in addition to a standard payout of 250 credits for three bass symbols 232 along the active pay line 249, the player is also awarded a side-bet award of 60 credits for a total of 310 credits as shown on the pay meter 221.

Figure 24:
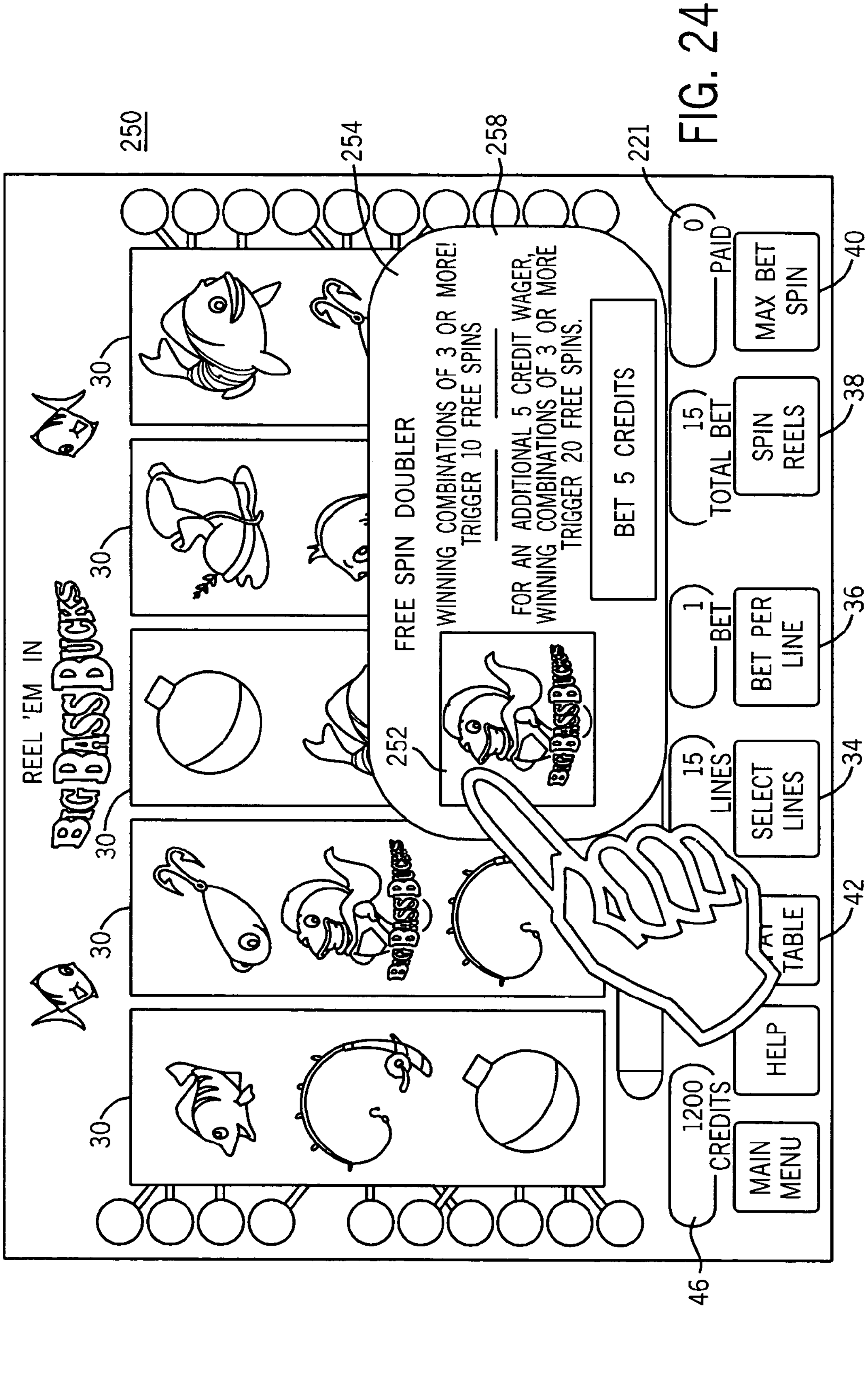
FIGS. 24 through 26 are a series of display images showing the use of a pop-up window to provide a player option to increase the value payout associated with bonus game play via increasing a number of free spins upon an occurrence of a winning symbol combination.
Figure 25:
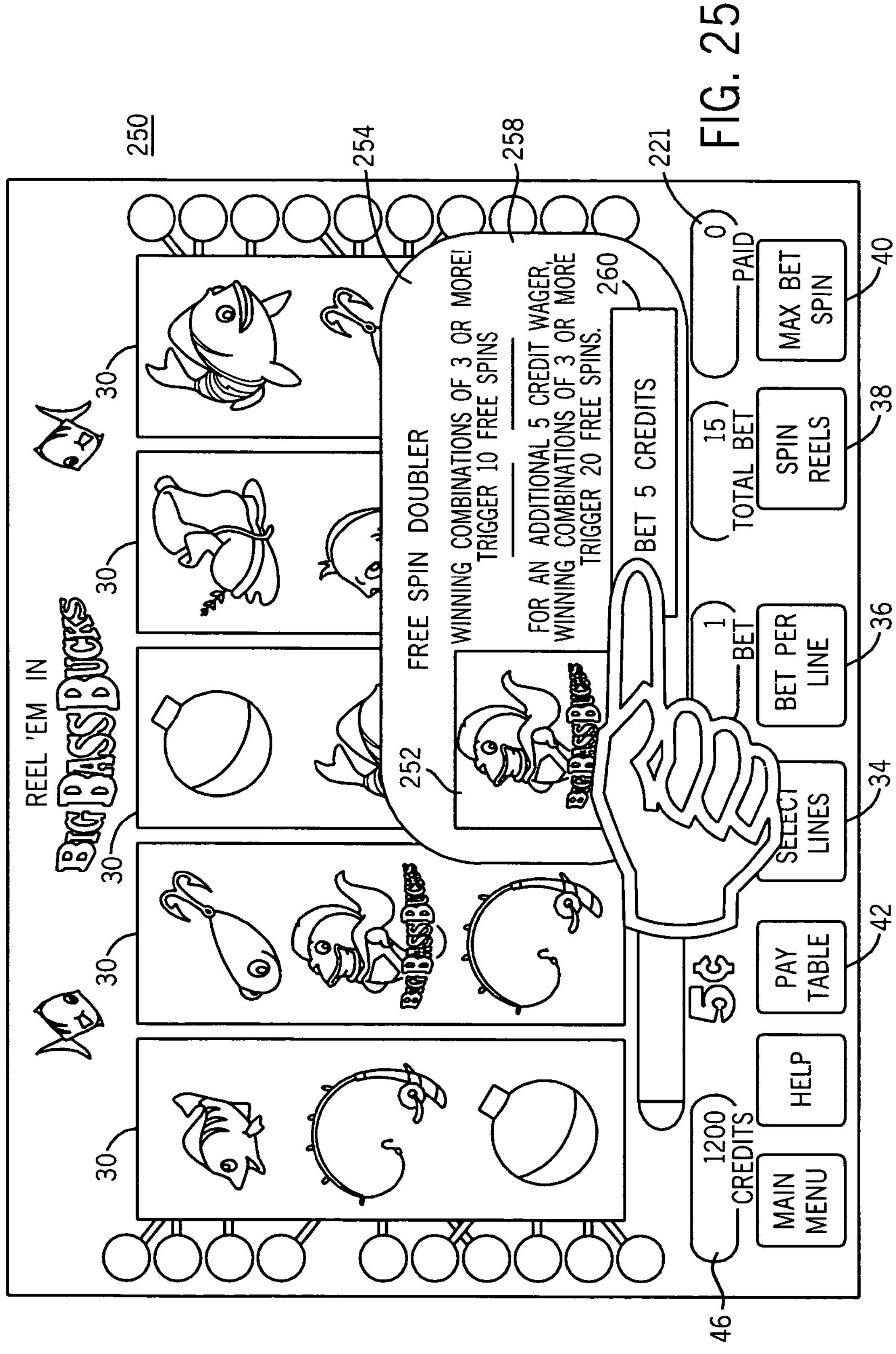
Figure 26:
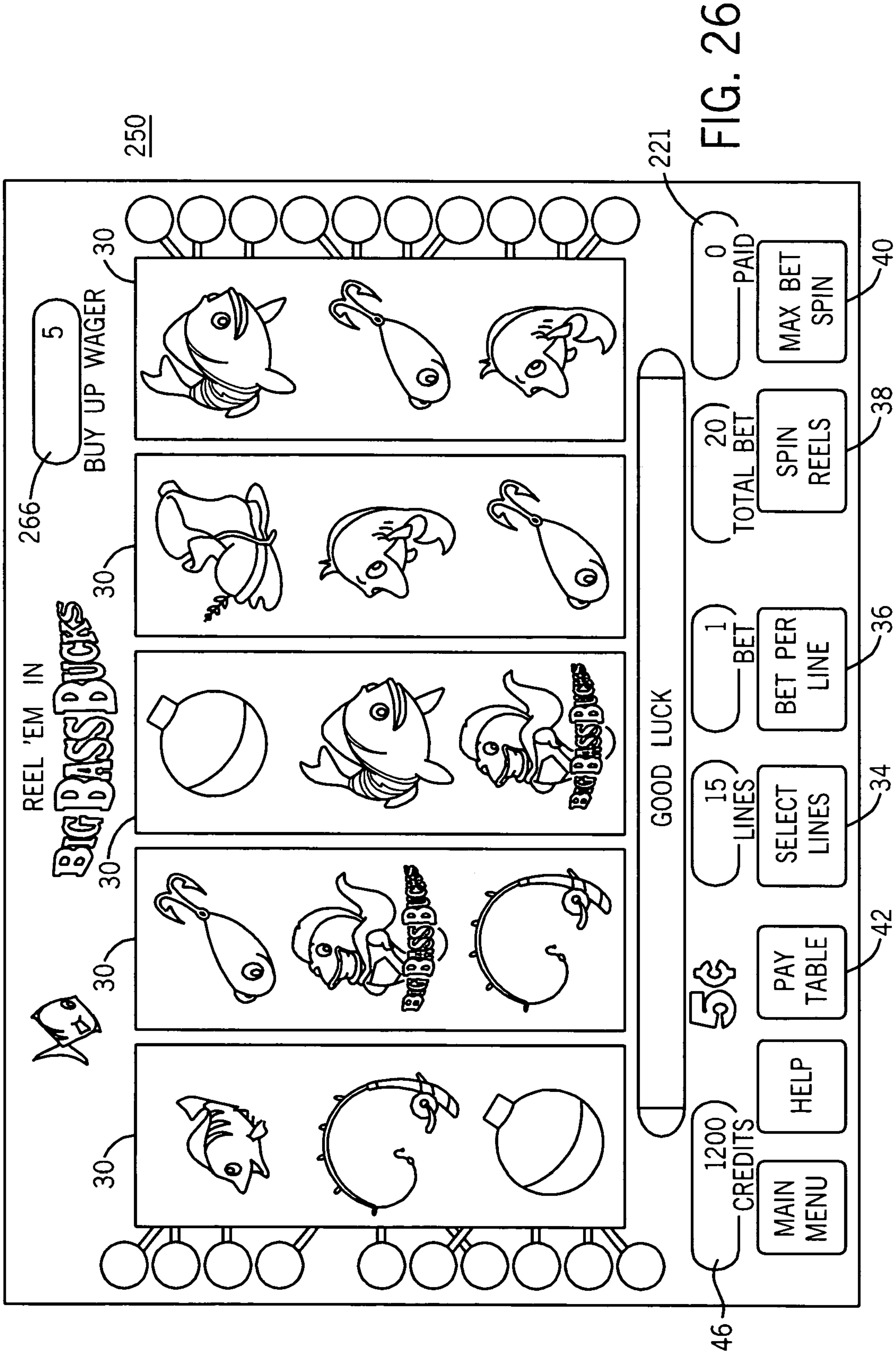

FIGS. 24 through 26 are a series of display images 250 showing the use of a pop-up window to provide an option, that when selected by the player, increase the value payout associated with bonus game play; in this case, an option to increase 10 free spins to 20 free spins upon a winning symbol combination. Before spinning the reels 30, the player can touch any symbol to place the side-bet (FIG. 24). In the illustrated example, the player touches a big bass bucks symbol 252. Touching the big bass bucks symbol 252 opens a pop-up window 254. The pop-up window 254 includes a side-bet feature choice area 258 preferably displayed adjacent to the big bass bucks symbol 252. Although not separately illustrated, the pop-up window 254 may also include a symbol-specific pay table area as discussed above.

In the illustrated example, the side-bet feature choice area 258 indicates that (i) an occurrence of three or more big bass bucks symbols 252 along an active pay line will yield a bonus of 10 free spins. Using the pop-up window 254 however, (ii) the player can double the number of free spins for an additional side-bet of 5 credits. In other words, for a side-bet of 5 credits, an occurrence of three or more big bass bucks symbols 252 along an active pay line will yield a bonus of 20 free spins.

Referring to FIG. 25, the player selects the onscreen "Bet 5 Credits" button 260 once to "purchased," for 5 credits, a bonus of 20 free spins to be paid upon an occurrence of three or more big bass bucks symbols 252 along an active pay line. Referring to FIG. 26, a "Buy Up Wager" meter 266 displayed above the reels 30 indicates the player's selection of the 5 credit side-bet. In the illustrated example, the player wagered a first wager of 15 credits (i.e., 1 credit bet per pay line for 15 pay lines) plus a second wager of 5 credits for the side-bet to increase 10 free spins to 20 free spins upon an occurrence of a side-bet winning outcome (e.g., three, four or five big bass bucks symbol 252 on an active pay line). Thus, the pop-up window providing various side-bet options allows a player to enhance his/her game play experience, while at the same time provides increased revenue for the gaming proprietor or casino operator.

Although only a few examples of placing a side-bet utilizing a pop-up window are specifically illustrated herein using the series of game display images above (i.e., increasing the value payout associated with bonus game play and increasing the value payouts associated with winning outcomes during basic game play), other examples may be similarly illustrated. For example, game display images may be utilized to illustrate a pop-up window side-bet scheme where a value output associated with a winning symbol combination is multiplied by a predetermined integer that is based on the side-bet amount. In other words, game display images may reflect a pop-up window side-bet scheme that allows a player to "buy a multiplier". Game display images may also be utilized to illustrate a pop-up window side-bet schemes that allow a player to make a side-bet that a reel symbol combination will appear in any pay line or in a particular pay line. Game display images may also be utilized to illustrate a pop-up window side-bet scheme that increases a player's odds of triggering bonus game play, that increases the odds of triggering bonus game play and increases the associated value payouts, that ensures a predetermined value payout for non-winning outcomes, that activates additional game features, that increases the value payouts associated with winning outcomes during basic game play after a partial game outcome is displayed, that activates an extra wild symbol capable of being repositioned within an outcome symbol array to yield a higher value payout, that provides a possibility of an additional movement of a stopped reel to reposition an extra reel symbol, provided above or below the outcome symbol array, into the outcome symbol array to yield an increased value payout, that provides a possibility of generating an extra pay line that includes an extra reel symbol, provided above or below the outcome symbol array, if the extra pay line results in an increased value payout, to name a few.

While the present invention has been described with reference to one or more particular embodiments, those skilled in the art will recognize that many changes may be made thereto without departing from the spirit and scope of the present invention.

For example, in view of the player's selections, the CPU may adjust other parameters (e.g., odds, payout schedules, functions of other symbols, etc.) of the game to ensure a desired house advantage. Further information about adjusting such parameters may be obtained from U.S. Pat. No. 6,068,552 to Walker et al., which is incorporated herein by reference.

In the illustrated examples, a player may "close" a pop-up window (i.e., remove the pop-up window from the display image) by touching any part of the display image outside the pop-up window. Alternatively or in addition, the pop-up window itself may include an onscreen "close" or "minimize" button akin to the buttons found in Microsoft Windows™.

Each of these embodiments and obvious variations thereof is contemplated as falling within the spirit and scope of the claimed invention, which is set forth in the following claims.

What is claimed is:

1. A method of conducting a wagering game on a gaming machine, the wagering game having a plurality of potential winning game outcomes, each winning outcome comprising a predetermined arrangement of available symbols, the gaming machine including a display device and a controller having a processor and a memory, the display device displaying a first randomly-generated array of symbols, the method comprising:

enabling a side-bet scheme configured to award an award if a selected symbol associated with a side-bet comprises a part of a winning outcome in a subsequent randomly-generated array of symbols;

in response to detecting a player selection of a symbol from the displayed first array of symbols, displaying a side-bet pop-up window of the side-bet scheme, the side-bet pop up window including a player-selectable side-bet option associated with the selected symbol;

detecting a side-bet wager placed via the side-bet pop-up window, the side-bet wager indicating player selection of the side-bet option to associate the selected symbol with an award if the selected symbol comprises a part of a winning outcome in a subsequent randomly generated array of symbols;

displaying a second randomly-generated array of symbols on the display device, the second randomly-generated array of symbols corresponding to an outcome of the wagering game.

2. The method of claim 1, further comprising:

awarding a first award to the player if the outcome of the wagering game includes one of the plurality of winning game outcomes; and awarding a second award to the player if the outcome of the wagering game includes one of the plurality of winning side-bet outcomes.

3. The method of claim 2, wherein the first award includes a first credit amount.

4. The method of claim 2, wherein the second award includes a second credit amount.

5. The method of claim 2, wherein the second award includes a number of free spins.

6. A method of conducting a wagering game on a gaming machine, the wagering game having a plurality of potential winning game outcomes, each winning outcome comprising a predetermined arrangement of available symbols, the gaming machine including a display device and a controller having a processor and a memory, the display device displaying a first array of symbols, the method comprising:

detecting a first wager from a player to play the wagering game;

if the first wager includes a minimum criteria, enabling a side-bet scheme configured to award an award if a selected symbol associated with a side-bet comprises a part of a winning outcome in a subsequent array of symbols;

displaying a first array of symbols corresponding to an outcome of the wagering game;

in response to detecting a first player selection of a first symbol directly from the displayed first array of symbols, displaying a first side-bet pop-up window of the side-bet scheme, the first side-bet pop-up window including a first player-selectable side-bet option associated with the selected first symbol;

detecting a second wager placed via the first side-bet pop-up window, the second wager indicating player selection of the first side-bet option to associate the selected first symbol with an award if the first symbol comprises a part of a winning outcome in a subsequent array of symbols; and displaying a second array of symbols on the display device, the second array of symbols corresponding to an outcome of the wagering game.

7. The method of claim 6, further comprising:

awarding a first award to the player if the outcome of the wagering game includes one of the plurality of winning game outcomes; and awarding a second award to the player if the outcome of the wagering game includes one of the plurality of first winning side-bet outcomes.

8. The method of claim 7, wherein the first award includes a first credit amount.

9. The method of claim 7, wherein the second award includes a second credit amount.

10. The method of claim 7, wherein the second award includes a number of free spins.

11. The method of claim 6, wherein displaying the second array of symbols on the display device includes rotating and stopping a plurality of symbol-bearing reels to place symbols on the reels in the second array.

12. The method of claim 6, wherein the minimum criteria includes activating a maximum number of pay lines.

13. The method of claim 6, wherein the gaming machine comprises an adaptable mechanical spinning reel slot machine including a plurality of electromechanical reels having a plurality of reel symbols thereon, and wherein displaying the first side-bet pop-up window includes displaying a first video side-bet pop-up window provided by a flat panel transmissive display positioned in front of the electromechanical reels.

14. The method of claim 6, wherein the first side-bet pop-up windows further includes a second side-bet option, the second side-bet option having the plurality of first winning side-bet outcomes.

15. The method of claim 6, wherein prior to displaying the second array of symbols and in response to detecting a second player selection of a second symbol from the first array of symbols, displaying a second side-bet pop-up window of the side-bet scheme, the second side-bet window including a third side-bet option, the third side-bet option having a plurality of second winning side-bet outcomes.

16. The method of claim 15, wherein the plurality of first winning side-bet outcomes and the plurality of second winning side-bet outcomes are included among the plurality of winning games outcomes.

17. The method of claim 6, wherein the first side-bet window further includes a first symbol-specific pay table.

18. The method of claim 6, wherein a likelihood of an occurrence of a bonus game is increased in response to detecting the second wager.

19. The method of claim 6, wherein in response to detecting the second wager, a number of free spins is multiplied if the outcome of the wagering game includes at least one of the plurality of first winning side-bet outcomes.

20. The method of claim 6, wherein a value payout average of a bonus game is increased in response to detecting the second wager.

21. The method of claim 6, wherein a value of at least one of the plurality of winning game outcomes is increased in response to detecting the second wager.

22. The method of claim 6, wherein a value of a winning symbol combination is multiplied by a predetermined integer in response to detecting the second wager, the predetermined integer based on the second wager amount.

23. The method of claim 6, wherein in response to detecting the second wager, a predetermined number of credits is awarded to the player if the outcome of the wagering game includes the first symbol.

24. The method of claim 6, wherein in response to detecting the second wager, a predetermined number of credits is awarded to the player if the outcome of the wagering game is a non-winning outcome, the predetermined number of credits based on the second wager amount.

25. The method of claim 6, wherein in response to detecting the second wager, a characteristic of the first symbol is enhanced to increase a likelihood that the outcome of the wagering game includes at least one of the plurality of first winning side-bet outcomes.

26. A method of conducting a wagering game on a gaming machine, the wagering game having a plurality of winning game outcomes, the gaming machine including a display device and a controller having a processor and a memory, the display device displaying a first array of symbols, the method comprising:

detecting a first wager from a player to play the wagering game;

if the first wager includes a minimum criteria, enabling a side-bet scheme;

displaying a partial outcome of the wagering game, the partial outcome including a portion of a second array of symbols;

in response to detecting a player selection of a symbol from the partial outcome including a portion of a second array of symbols, displaying a side-bet pop-up window of the side-bet scheme, the side-bet pop-up window including a player-selectable side-bet option, the side-bet option having a plurality of winning side-bet outcomes;

detecting a second wager placed via the side-bet pop-up window, the second wager indicating player selection of the side-bet option; and displaying a full outcome of the wagering game, the full outcome including the second array of symbols, the second array of symbols including the portion of the second array of symbols.

27. The method of claim 26, further comprising:

awarding a first award to the player if the outcome of the wagering game includes one of the plurality of winning game outcomes; and awarding a second award to the player if the outcome of the wagering game includes one of the plurality of winning side-bet outcomes.

28. The method of claim 26, wherein displaying the partial outcome of the wagering game includes rotating and stopping at least two of a plurality of symbol-bearing reels to place symbols on the at least two of the plurality of symbol-bearing reels in the portion of the second array of symbols, and wherein displaying the full outcome of the wagering game includes rotating and stopping the remaining rotating reels of the plurality of symbol-bearing reels to place symbols on the reels in the second array.

29. The method of claim 26, wherein the side-bet pop-up windows further includes a second side-bet option, the second side-bet option having the plurality of first winning side-bet outcomes.

30. The method of claim 26, wherein the minimum criteria includes activating a maximum number of pay lines.

31. The method of claim 26, wherein the plurality of winning side-bet outcomes is included among the plurality of winning game outcomes.

32. The method of claim 26, wherein the side-bet window further includes a symbol-specific pay table.

* * * * *

UNITED STATES PATENT AND TRADEMARK OFFICE

CERTIFICATE OF CORRECTION

PATENT NO. : 7,618,319 B2
APPLICATION NO. : 10/832564
DATED : November 17, 2009
INVENTOR(S) : Casey et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1487 days.

Signed and Sealed this

Nineteenth Day of October, 2010

David J. Kappos

*Director of the United States Patent and Trademark Office*